United States Patent
Yabuzaki et al.

(10) Patent No.: US 8,379,419 B2
(45) Date of Patent: Feb. 19, 2013

(54) SOFT-STOP OVERVOLTAGE PROTECTION CIRCUIT FOR POWER FACTOR CORRECTION TYPE SWITCHING POWER SUPPLY UNIT

(75) Inventors: Jun Yabuzaki, Matsumoto (JP); Jian Chen, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 114 days.

(21) Appl. No.: 12/951,746

(22) Filed: Nov. 22, 2010

(65) Prior Publication Data

US 2011/0122664 A1 May 26, 2011

(30) Foreign Application Priority Data

Nov. 26, 2009 (JP) .................................. 2009-268578
Jul. 22, 2010 (JP) .................................. 2010-164980

(51) Int. Cl.
- *H02H 7/10* (2006.01)
- *H02H 7/122* (2006.01)
- *H02H 7/00* (2006.01)
- *H02H 3/20* (2006.01)

(52) U.S. Cl. ......... 363/50; 363/56.11; 323/901; 361/18; 361/91.1

(58) Field of Classification Search ............... 323/205, 323/207, 222, 282, 284, 285; 363/50, 55, 363/50.01; 361/91.1, 18
See application file for complete search history.

(56) References Cited

U.S. PATENT DOCUMENTS

| | | | | |
|---|---|---|---|---|
| 6,731,524 | B2 * | 5/2004 | Elek et al. | 363/70 |
| 6,756,771 | B1 * | 6/2004 | Ball et al. | 323/222 |
| 6,980,445 | B2 * | 12/2005 | Fukumoto et al. | 363/45 |
| 7,514,913 | B2 * | 4/2009 | Zhang et al. | 323/299 |
| 8,085,021 | B2 * | 12/2011 | Chen et al. | 323/282 |
| 2007/0253223 | A1 | 11/2007 | Neidorff et al. | |
| 2009/0180302 | A1 | 7/2009 | Kawabe et al. | |

FOREIGN PATENT DOCUMENTS

JP 2004-297915 A 10/2004
JP 2009-165316 A 7/2009

* cited by examiner

*Primary Examiner* — Bao Q Vu
*Assistant Examiner* — Zekre Tsehaye
(74) *Attorney, Agent, or Firm* — Rossi, Kimms & McDowell LLP

(57) ABSTRACT

A soft-stop overvoltage protection circuit, into which a soft-stop overvoltage detection voltage proportional to a direct current output voltage is input, reduces the output of a multiplier in accordance with the soft-stop overvoltage detection voltage when the soft-stop overvoltage detection voltage exceeds a first threshold value. An overvoltage protection circuit, a second threshold value higher than the first threshold value being set, compulsorily turns off a switching element by outputting an overvoltage detection signal when the soft-stop overvoltage detection voltage exceeds the second threshold value. The soft-stop overvoltage protection circuit compulsorily increases the output of a voltage error amplifier circuit on the output voltage decreasing. When the output of the voltage error amplifier circuit increases suddenly, and the output voltage rises excessively, the soft-stop overvoltage protection circuit decreases the output of the multiplier, thus curbing the rise of the output voltage.

13 Claims, 12 Drawing Sheets

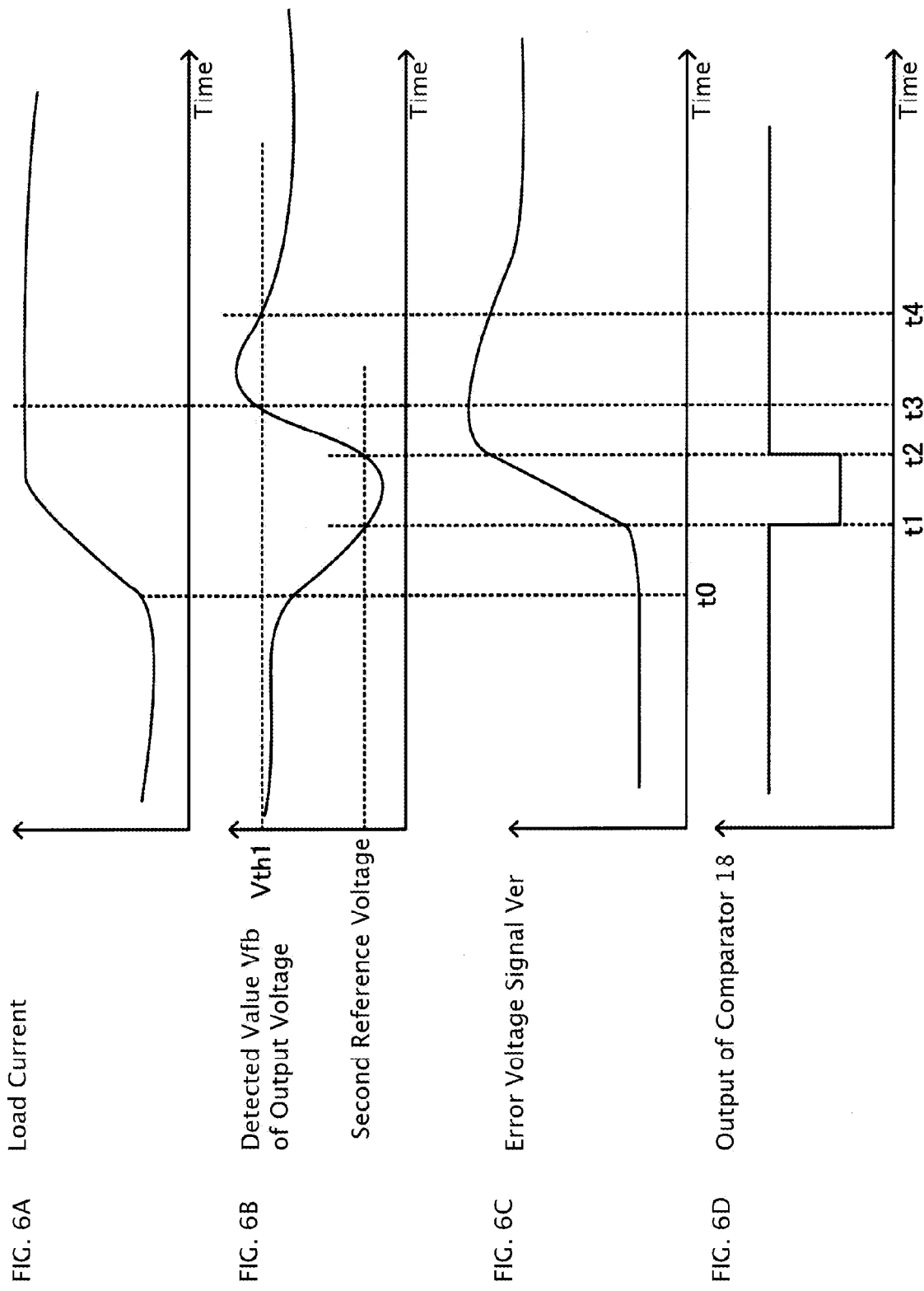

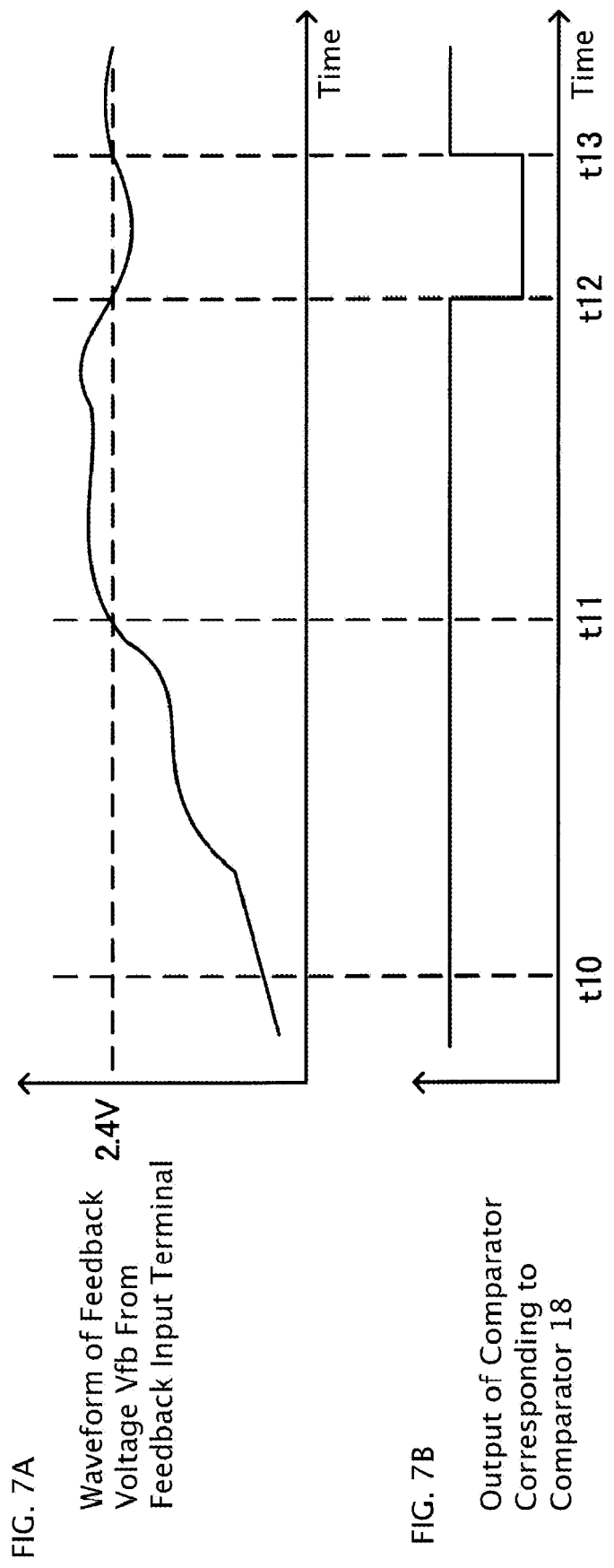

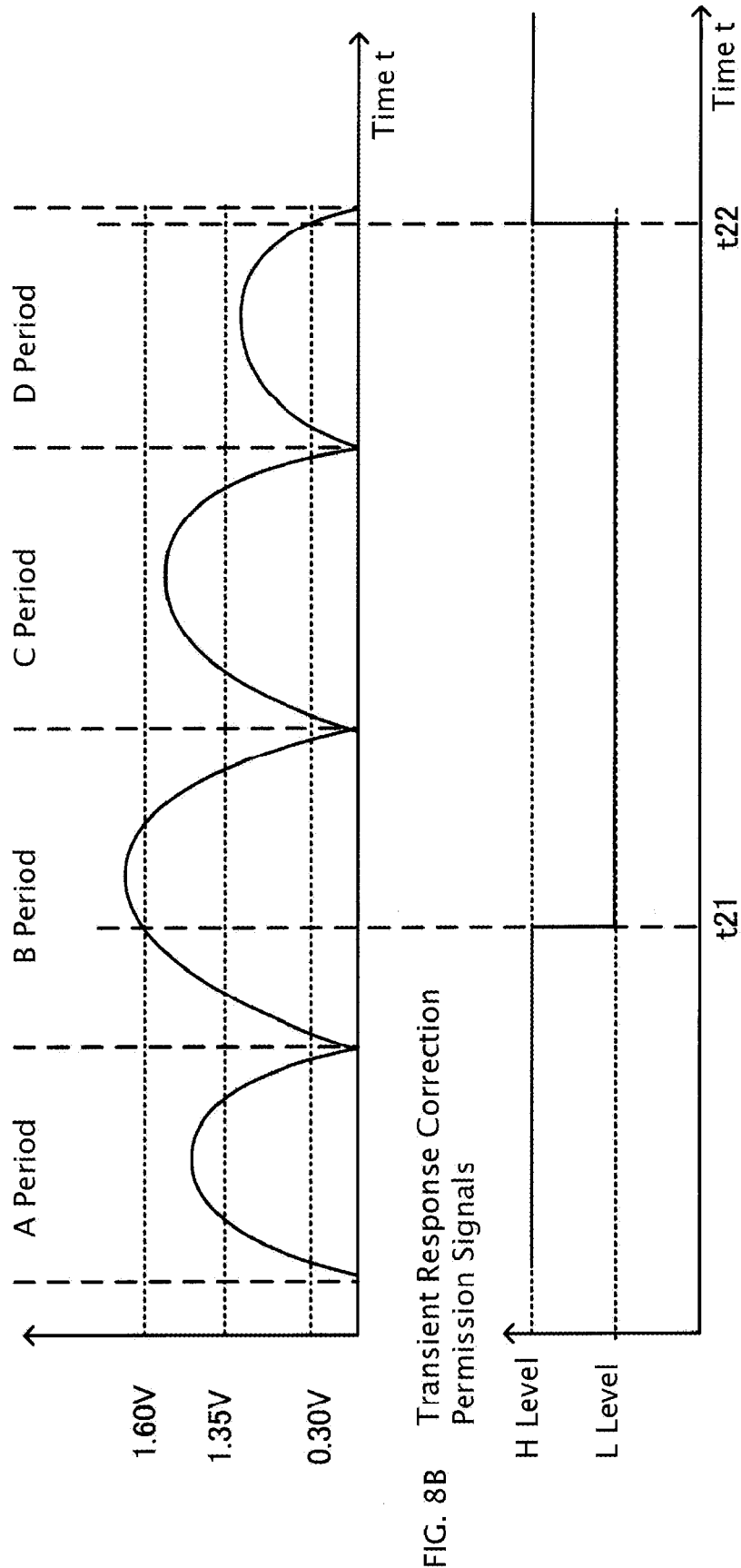

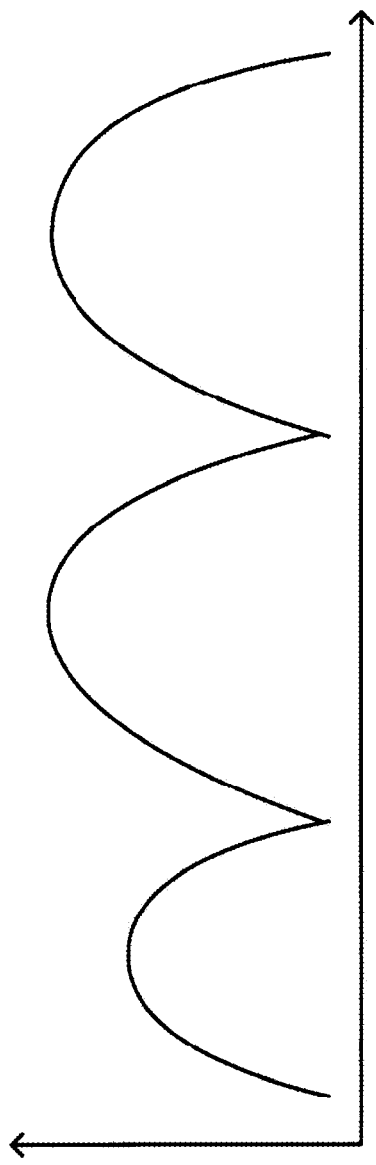
FIG. 9A    Average Current Voltage
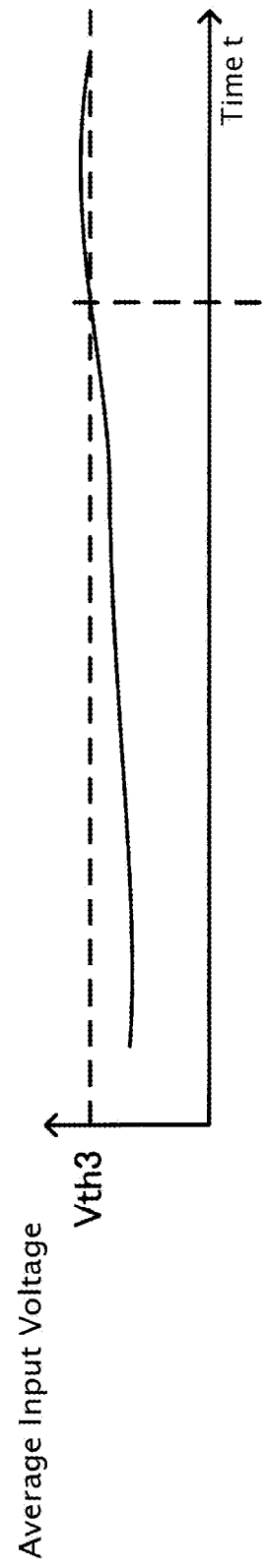
FIG. 9B    Average Input Voltage
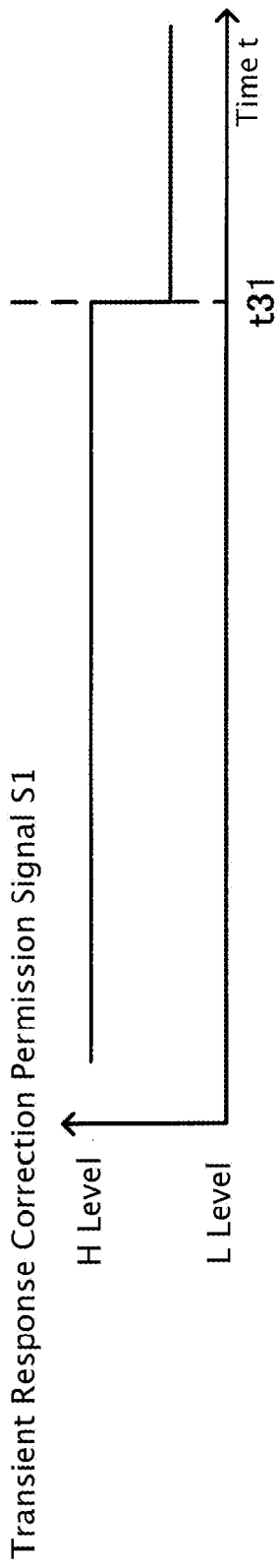
FIG. 9C    Transient Response Correction Permission Signal S1

24 Multiplier
27 Inversion Amplifier Circuit
36 Overcurrent Protection Circuit

SOFT-STOP OVERVOLTAGE PROTECTION CIRCUIT FOR POWER FACTOR CORRECTION TYPE SWITCHING POWER SUPPLY UNIT

BACKGROUND OF THE INVENTION

1. Technical Field

The present invention relates to a power factor correction type switching power supply unit that converts an alternating current voltage into a direct current voltage, and in particular relates to a power factor correction type switching power supply unit having a transient response correcting function that swiftly raises the output voltage when the output voltage decreases to or below a certain threshold value.

2. Related Art

In recent years, a switching power supply unit that has an alternating current voltage as an input has been widely utilized in electronic instruments. This kind of switching power supply unit is one which, by causing a switching operation of a switching element linking an input and an output, converts a full-wave rectified alternating current input voltage into a direct current output voltage of a desired size, and supplies it to a load.

FIG. 12 is a circuit diagram showing one example of a heretofore known power factor correction type switching power supply unit. Herein, a power factor correction (PFC) type switching power supply circuit that operates in continuous conduction mode is shown, and this is applied to an active filter type power supply unit.

The heretofore known power factor correction type switching power supply unit shown in FIG. 12 has a full-wave rectifier 4 that full-wave rectifies a commercial power supply 2, and its output is connected to one end of an inductor L1. The connection point of the other end of the inductor L1 and a diode D1 is connected to the drain terminal of, for example, an N-channel type MOS transistor (a metal oxide semiconductor field-effect transistor) configuring a switching element 6. The other end of the inductor L1 is connected to a load 8 via a rectifying and smoothing circuit formed of the diode D1 and a capacitor C1, and a direct current output voltage Vout is output to the load 8.

As well as the source terminal of the MOS transistor, which is the switching element 6, being connected to the ground (GND), the gate terminal is connected to an output terminal DO of a power factor correction control circuit 10. One end of a series resistance circuit formed of resistors R1 and R2 is connected to the connection point of the full-wave rectifier 4 and inductor L1, and the other end is grounded. A multiplier input terminal VDET of the power factor correction control circuit 10 is a terminal into which a detected value of an alternating current input voltage full-wave rectified by the full-wave rectifier 4 is input, and the connection point of the resistors R1 and R2 is connected to the multiplier input terminal VDET. Also, the full-wave rectifier 4 is grounded via a resistor R3, and the connection point of the full-wave rectifier 4 and resistor R3 is connected to an inductor current signal generating input terminal IS of the power factor correction control circuit 10. Furthermore, a series circuit of resistors R4 and R5 is connected in parallel with the load 8, and a direct current output voltage Vout the same as that of the load 8 is applied thereto. A feedback voltage input terminal FB of the power factor correction control circuit 10 being a terminal into which a detected value of the direct current output voltage Vout is input, herein, the connection point of the resistors R4 and R5 is connected to the feedback voltage input terminal FB, and a voltage signal wherein the direct current output voltage Vout is voltage divided is returned here.

Next, a simple description will be given of an operation of the heretofore known power factor correction type switching power supply unit of FIG. 12.

The heretofore known power factor correction type switching power supply unit of FIG. 12 employs a control method called an average current control method, average current mode control, or the like, and the power factor correction control circuit 10 is one that controls a current flowing to the alternating current commercial power supply 2 side into a sinusoidal wave in the same phase as that of the alternating current input voltage, while stabilizing the direct current output voltage Vout. The feedback voltage input terminal FB of the power factor correction control circuit 10 is connected to an input terminal of an operational transconductance amplifier (OTA) 15 configuring a voltage error amplifier circuit 14, together with a reference voltage source 12 that sets a voltage command value for the direct current output voltage Vout. The voltage error amplifier circuit 14 is configured of the OTA 15, a capacitor C2 for converting a current from the OTA 15 into a voltage, and a series circuit of a resistor R6 and capacitor C3 for phase compensation, each connected between the output terminal of the OTA 15 and a GND. The voltage error amplifier circuit 14 generates a voltage error signal Ver wherein the difference between the detected value of the direct current output voltage Vout (in this case, a divided voltage value) Vfb and the voltage command value (for example, 2.5V) of the reference voltage source 12 is amplified. The voltage error signal Ver is supplied to a first input terminal of a multiplier 24.

A second input terminal of the multiplier 24 is connected to the multiplier input terminal VDET of the power factor correction control circuit 10, and a detected value (a divided voltage value in this case) Vdet of the alternating current input voltage full-wave rectified by the full-wave rectifier 4 is input from here. The voltage error signal Ver supplied to the first input terminal and the detected value Vdet of the alternating current input voltage supplied to the second input terminal are multiplied in the multiplier 24, becoming the value of a current command (a current reference signal) Vmul to a current error amplifier circuit 26.

The current error amplifier circuit 26 is also connected to an inductor current signal generating input terminal IS via an inversion amplifier circuit 27. A voltage signal, which is an inductor current $I_L$ voltage converted in the current detecting resistor R3, is input into the inductor current signal generating input terminal IS, and an inductor current signal inversion amplified in the inversion amplifier circuit 27 is input into the current error amplifier circuit 26, along with the current reference signal Vmul. A current error signal wherein the differential voltage of the current reference signal Vmul and inductor current signal is amplified is output from the current error amplifier circuit 26.

As the voltage signal from the inductor current signal generating input terminal IS is of a negative potential, the inversion amplifier circuit 27 is provided in order to convert the voltage signal into an inductor current signal with a positive potential. As the function and configuration of the inversion amplifier circuit 27 itself are commonly known, a description thereof will be omitted. Also, in an oscillator circuit (OSC) 28, a sawtooth wave or triangular wave of a constant frequency is generated as a carrier signal that determines a switching cycle, and input into a PWM comparator 30. The PWM comparator 30 into which the carrier signal and the current error signal are input generates a pulse width modulation (PWM) control signal by comparing the magnitudes of the signals, and this is applied to the gate terminal of the switching element 6 via an AND circuit 32 and a driver circuit 34.

Herein, an overcurrent protection (OCP) circuit 36 is connected to the output side of the inversion amplifier circuit 27. The overcurrent protection (OCP) circuit 36 limits the maximum value of the inductor current $I_L$ based on the inductor current signal, which is the output of the inversion amplifier circuit 27. Herein, when an inductor current $I_L$ exceeding a predetermined threshold value flows, an L (low) level overcurrent limit signal is input into the AND circuit 32, and the output of the AND circuit 32 compulsorily becomes L. As a switching signal is output to the output terminal DO of the power factor correction control circuit 10 from the AND circuit 32 via the driver circuit 34, the switching element 6 is turned off on the output of the AND circuit 32 becoming L. By controlling the on-off timing of the switching element 6 in this way, it is possible to control the value of a current flowing to the capacitor C1 via the diode D1. Actually, a feedback constant setting circuit is connected between the input and output terminals of the current error amplifier circuit 26, but a depiction of the feedback constant setting circuit is omitted from FIG. 12.

In order to improve the power factor, that is, in order to cause the waveform of the current flowing to the alternating current commercial power supply 2 side to conform exactly to a waveform of a cycle of between 50 and 60 Hz of the alternating current input voltage, it is necessary to have the response characteristics of the power factor correction type switching power supply unit at around 10 Hz. However, as the improvement of the power factor is in a trade-off relationship with transient response characteristics with respect to a load fluctuation, or the like, there is a problem in a power supply unit used in a kind of application that requires transient response characteristics.

As a method of correcting the transient response characteristics, it is possible to respond by instantaneously raising the output of the voltage error amplifier circuit 14 when the direct current output voltage Vout decreases (for example, refer to U.S. Patent Application Publication No. 2007/0253223 and FIGS. 19A and 19B, Paragraphs [0119] to [0122] thereof). In the power factor correction control circuit 10, in the same way as in the one in U.S. Patent Application Publication No. 2007/0253223, a transient response corrector circuit 38 configured of a reference voltage source 16, a comparator 18, a constant current source 20, and a P-channel type MOSFET 22 is used. In the transient response corrector circuit 38, a second reference voltage (2.4V) lower than the voltage command value (2.5V) of the reference voltage source 12 is output from the reference voltage source 16, and it is determined that the direct current output voltage Vout has decreased. Then, on it being determined that the direct current output voltage Vout has decreased, a constant current is injected from the constant current source 20 into the capacitor C2 connected to the output side of the OTA 15, and the voltage error signal Ver to the multiplier 24 is compulsorily increased. Because of this, the output of the voltage error amplifier circuit 14 is instantaneously raised, and the direct current output voltage Vout is increased. However, according to this method, as the voltage error signal Ver is increased while ignoring the response characteristics of the power factor correction type switching power supply unit, there is a problem in that the inductor current $I_L$ and the direct current output voltage Vout may rise excessively, and an abnormal voltage be applied to the load 8.

In response to this, an overvoltage protection (OVP) circuit has been used to date as a way of dealing with the fluctuation of the direct current output voltage Vout (for example, refer to JP-A-2009-165316 and Paragraphs [0026] to [0076], and FIGS. 1 to 5 therein). This circuit, when the output voltage becomes excessive, causes an overvoltage protection function to operate with respect to the switching element 6 in order that the direct current output voltage Vout does not overshoot, and completely stops the switching operation of the switching element 6 after a certain time, or instantaneously (the switching element 6 is turned off). However, when this is applied to the power factor correction type switching power supply unit together with the transient response corrector circuit 38, there is a repetition of switching stopped→output reduction→switching restart with OVP omitted→output increase→overshoot→switching operation stopped by OVP function.

Also, in the transient response corrector circuit 38, the transient response correcting function operates regardless of the size of the alternating current input voltage. In the event that the transient response corrector circuit 38 functions at a start-up time or when the alternating current input voltage is high, the increase rate of the inductor current $I_L$ proportional to the voltage error signal and input voltage becomes too high. In this kind of case, as the transient response characteristics are originally reduced, the inductor current $I_L$ overshoots, entering an overcurrent protection condition, and a squeaking occurs at a time of the overcurrent protection operation of the overcurrent protection circuit 36. Alternatively, when providing an input filter having an unshown inductor for the commercial power supply 2, an input voltage drop is caused in the event that too much instantaneous power is removed, and it may happen that damage is caused to each element, and a malfunction occurs.

When correcting the transient response characteristics in the power factor correction type switching power supply unit in this way, simply raising the response characteristics of the output voltage feedback loop when the direct current output voltage decreases conversely causes an adverse effect, and may result in a reduction of efficiency and power factor.

SUMMARY OF THE INVENTION

Embodiments of the invention, having been contrived bearing in mind these above-discussed points, have an object of providing a power factor correction type switching power supply unit that uses a transient response corrector circuit with a simple configuration, and that can prevent an adverse effect caused by the transient response corrector circuit, and achieve output voltage stability.

According to one aspect of the invention, in order to solve the heretofore described problems, there is provided a power factor correction type switching power supply unit that, based on an alternating current input voltage full-wave rectified in a diode bridge, supplies a direct current output voltage of a step-up type converter having an inductor, a switching element, and an output capacitor to a load.

The power factor correction type switching power supply unit according to the aspect of the invention includes a voltage error amplifier circuit (14) that amplifies the difference between a detected value of the direct current output voltage and a first reference voltage (2.5V), and outputs a voltage error signal, a multiplier (24) that multiplies the voltage error signal output from the voltage error amplifier circuit and a detected value of the full-wave rectified alternating current input voltage, a control circuit (26 to 30) that on-off controls the switching element based on an output signal of the multiplier and an inductor current signal detecting an inductor current flowing through the inductor, a soft-stop overvoltage protection circuit (90), into which a soft-stop overvoltage detection voltage corresponding to the detected value of the direct current output voltage is input, that reduces the output of the multiplier in accordance with the soft-stop overvoltage detection voltage when the soft-stop overvoltage detection voltage exceeds a first threshold value, an overvoltage protection circuit (100) that, a second threshold value higher than the first threshold value being set, compulsorily turns off the switching element by outputting an overvoltage detection signal when the soft-stop overvoltage detection voltage exceeds the second threshold value, and a transient response corrector circuit (38s) having an output increase circuit (20 and 22) that, a second reference voltage (2.4V) lower than the first reference voltage (2.5V) being set, compulsorily increases the output of the voltage error amplifier circuit when the detected value of the direct current output voltage is equal to or lower than the second reference voltage (2.4V).

According to the power factor correction type switching power supply unit of the aspect of the invention, it is possible to realize a transient response corrector circuit with a simple circuit, and it is possible to supply a stable direct current output voltage to a load, even when a transient response correction operation functions.

Furthermore, according to the aspect of the invention, by curbing the transient response correction operation when the power factor correction control circuit starts up, or when the alternating current input voltage is high, it is possible to curb squeaking, and prevent the removing of too much instantaneous power.

BRIEF DESCRIPTION OF THE DRAWINGS

FIGS. 6A to 6D are timing diagrams for illustrating an operation of a transient response correction circuit when there is a sudden increase in load;

FIGS. 7A and 7B are timing diagrams for illustrating an operation of the transient response correction circuit at a start-up time of the power factor correction control circuit;

FIGS. 8A and 8B are diagrams showing a change in alternating current input voltage, and a permission signal for a corresponding transient response correction;

FIGS. 9A to 9C are diagrams showing a change in average input voltage of an alternating current input, and a permission signal for a corresponding transient response correction;

DETAILED DESCRIPTION OF THE EMBODIMENTS

Hereafter, a description will be given of three embodiments of the invention, with reference to the drawings.

First Embodiment

Figure 12:
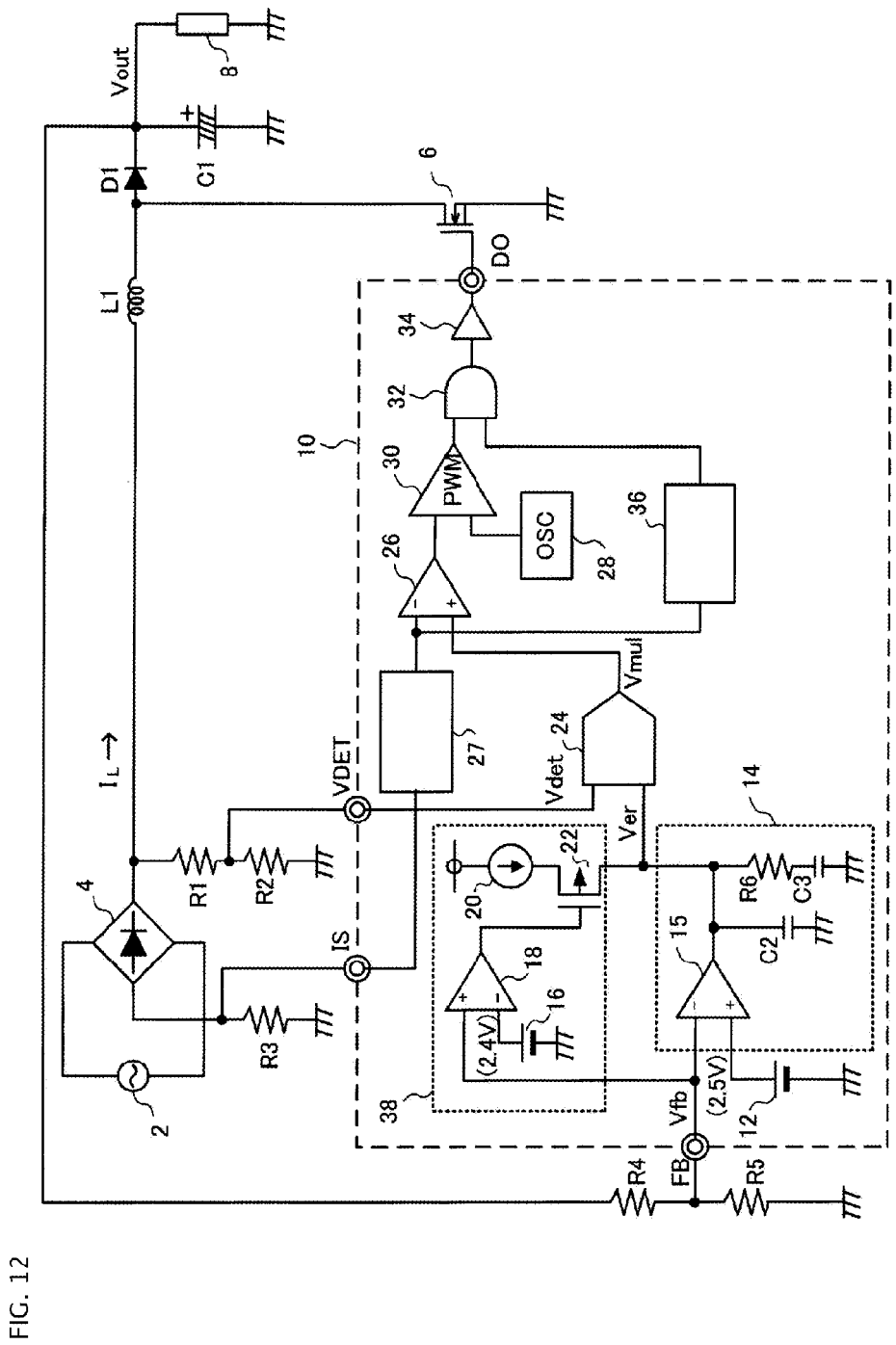
FIG. 12 is a circuit diagram showing one example of a heretofore known power factor correction type switching power supply unit.

A power factor correction type switching power supply unit that operates in continuous mode, which is a first embodiment of the invention, has the same configuration as that of the heretofore known power factor correction type switching power supply unit shown in FIG. 12, except that the power factor correction control circuit 10 is replaced with a power factor correction control circuit 10s.

Figure 1:
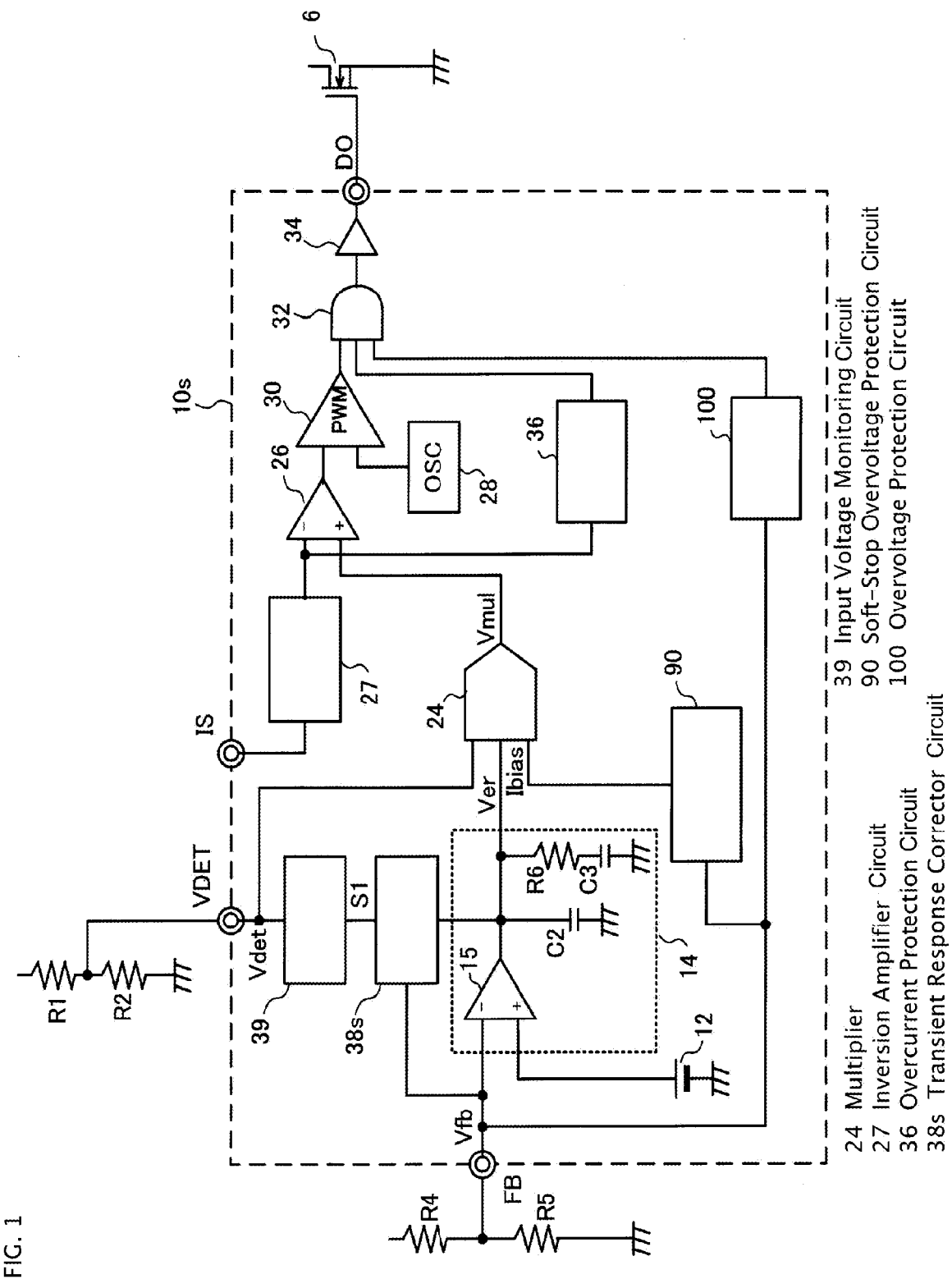
FIG. 1 is a circuit diagram showing a configuration of a power factor correction control circuit according to a first embodiment of the invention.

FIG. 1 is a circuit diagram showing the power factor correction control circuit according to the first embodiment of the invention. The power factor correction control circuit 10s is one that controls a current flowing to an alternating current commercial power supply 2 side into a sinusoidal wave in the same phase as that of an alternating current input voltage, while stabilizing a direct current output voltage Vout, in the same way as the power factor correction control circuit 10. A feedback voltage input terminal FB of the power factor correction control circuit 10s is connected to one input terminal (the inversion input terminal) of an operational transconductance amplifier (OTA) 15. A reference voltage source 12 that sets a voltage command value (a first reference voltage: for example, 2.5V) for the direct current output voltage Vout is connected to the other input terminal (the non-inversion input terminal) of the OTA 15. A voltage error amplifier circuit 14 is configured of the OTA 15, which converts a voltage signal into a current signal, as well as a capacitor C2 for converting a current from the OTA 15 into a voltage, and a series circuit of a resistor R6 and capacitor C3 for phase compensation, each connected between the output terminal of the OTA 15 and a GND. The voltage error amplifier circuit 14 generates a voltage error signal Ver wherein the difference between the detected value of the direct current output voltage Vout (in this case, a return signal which is a divided voltage value of the direct current output voltage Vout) and the voltage command value of the reference voltage source 12 is amplified. The voltage error signal Ver is a voltage at either end of the capacitor C2, is compulsorily increased by a current signal from a transient response corrector circuit 38s, to be illustrated in detail hereafter using FIG. 3, at a time of a transient response characteristic correction, and is supplied to a first input terminal of a multiplier 24.

In the power factor correction control circuit 10s, its multiplier input terminal VDET and a second input terminal of the multiplier 24 are connected, and a detected value (a divided voltage value in this case) Vdet of an output voltage of a full-wave rectifier 4 is input from here into the multiplier 24. Also, a bias current Ibias generated based on a soft-stop overvoltage detection voltage proportional to the direct current output voltage is supplied from a soft-stop overvoltage protection circuit 90, to be illustrated in detail hereafter using FIG. 4, to the multiplier 24.

The multiplier 24 multiplies the voltage error signal Ver, which is the first input signal, and the second input signal Vdet, which is the divided voltage value of the output voltage of the full-wave rectifier 4 (the detected value of a full-wave rectified alternating current input voltage). The result of the multiplication is output as a current reference signal Vmul to the non-inversion input terminal of a current error amplifier circuit 26. An inductor current signal wherein a voltage signal, wherein an inductor current $I_L$ input via an inductor current signal generating input terminal IS is detected by a current detecting resistor R3, is inversion amplified by an inversion amplifier circuit 27 is input into the current error amplifier circuit 26. A current error signal, wherein the difference between the current reference signal Vmul and the inductor current signal is amplified, is output from the current error amplifier circuit 26. As the voltage signal from the inductor current signal generating input terminal IS is of a negative potential, the inversion amplifier circuit 27 is provided in order to convert the voltage signal into an inductor current signal with a positive potential. As the function and configuration of the inversion amplifier circuit 27 itself are commonly known, a description thereof will be omitted. Also, the output of the inversion amplifier circuit 27 is also connected to an overcurrent protection (OCP) circuit 36. As the function of the overcurrent protection circuit 36 is the same as that of the one in the power factor correction control circuit 10 shown in FIG. 12, a description will be omitted. In the oscillator circuit (OSC) 28, a sawtooth wave or triangular wave of a constant frequency is generated as a carrier signal that determines a switching cycle, which is a cycle of an on-off operation of a switching element 6, and input into a PWM comparator 30. The PWM comparator 30, with the carrier signal and the current error signal from the current error amplifier circuit 26 as inputs, generates a PWM control signal to be applied to the gate terminal of the switching element 6 via an AND circuit 32 and a driver circuit 34 by comparing the magnitudes of the signals.

A second reference voltage (for example, 2.4V) lower than the voltage command value of the reference voltage source 12 set for the voltage error amplifier circuit 14, that is, the first reference voltage of 2.5V, is set in the transient response corrector circuit 38s. The second reference voltage is output from a reference voltage source 16 shown in FIG. 3, to be described hereafter, and in the event that a detected value Vfb of the direct current output voltage Vout is equal to or lower than the second reference voltage, the output of the voltage error amplifier circuit 14 is compulsorily increased, thus correcting the transient response characteristics. Also, an input voltage monitoring circuit 39 is connected to the multiplier input terminal VDET, and the detected value Vdet of the full-wave rectified alternating current input voltage is supplied (refer to FIG. 2, to be described hereafter). Herein, the input voltage monitoring circuit 39 operates in such a way as to output a permission signal S1 for correcting the transient response characteristics to the transient response corrector circuit 38s, while comparing the detected value Vdet with a third reference voltage (for example, 1.6V) or a fourth reference voltage (for example, 1.35V). The permission signal S1 permits the operation of the transient response corrector circuit 38s provided that the detected value of the full-wave rectified alternating current input voltage does not exceed the fourth reference voltage during a half-cycle of the alternating current input voltage, and prohibits the operation of the transient response corrector circuit 38s when the detected value exceeds the third reference voltage.

Also, the soft-stop overvoltage protection circuit 90 and an overvoltage protection circuit 100 are provided in the power factor correction control circuit 10s. Of these, the soft-stop overvoltage protection circuit 90 is connected to the feedback voltage input terminal FB, and the soft-stop overvoltage detection voltage Vfb corresponding to the detected value of the direct current output voltage Vout (in this case, a return signal which is a divided voltage value of the direct current output voltage Vout) is input. Herein, a first threshold value is set, and the soft-stop overvoltage protection circuit 90 functions in such away as to reduce the output of the multiplier 24 in accordance with the soft-stop overvoltage detection voltage Vfb when the soft-stop overvoltage detection voltage Vfb exceeds the first threshold value.

Herein, the overvoltage protection circuit 100, in the same way as the soft-stop overvoltage protection circuit 90, is connected to the feedback voltage input terminal FB, and the soft-stop overvoltage detection voltage Vfb is input. In the overvoltage protection circuit 100, a second threshold value higher than the first threshold value is set, it is detected that the soft-stop overvoltage detection voltage Vfb has exceeded the second threshold value, an L level overvoltage detection signal is input into the AND circuit 32, and the output of the AND circuit 32 compulsorily becomes L. A switching signal for turning the switching element 6 on and off is output to an output terminal DO of the power factor correction control circuit 10s from the AND circuit 32 via a driver circuit 34 and, on the L level overvoltage detection signal being input into the AND circuit 32, the switching element 6 is compulsorily turned off.

A point in which the power factor correction control circuit 10s essentially differs from the heretofore known power factor correction control circuit 10 is that an excessive increase of the inductor current $I_L$ is prevented by providing the soft-stop overvoltage protection circuit 90, and reducing the output of the multiplier 24, thus preventing a squeaking. Also, the overvoltage protection circuit 100 is provided, and the on-off operation of the switching element 6 is stopped when the direct current output voltage rises to or above the set value.

Next, a description will be given of a specific configuration of the input voltage monitoring circuit 39 that outputs the permission signal S1 to the transient response corrector circuit 38s in the power factor correction control circuit 10s.

Figure 2:
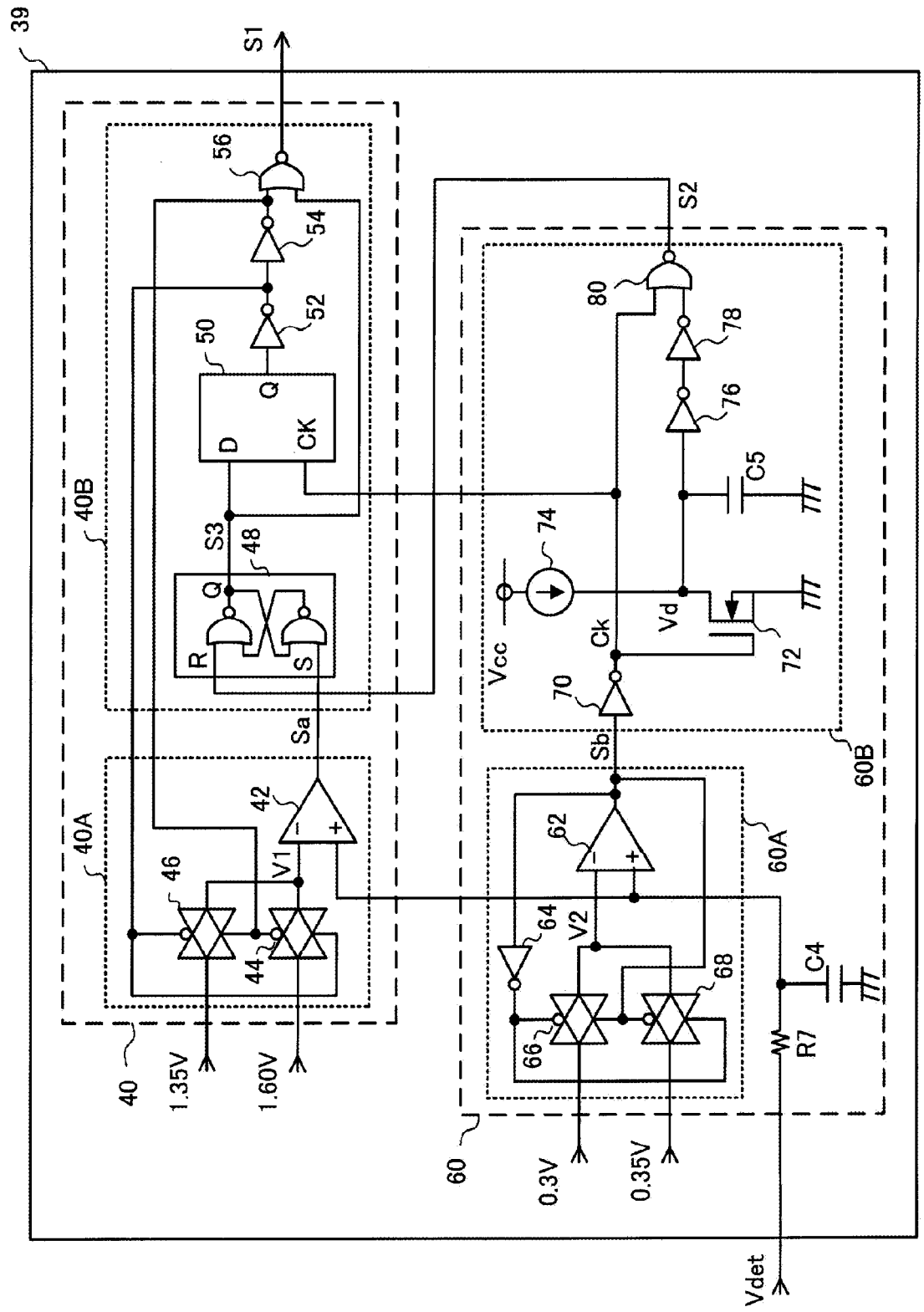
FIG. 2 is a circuit diagram showing one example of a specific configuration of an input voltage monitoring circuit.

FIG. 2 is a circuit diagram showing one example of a specific configuration of the input voltage monitoring circuit.

The input voltage monitoring circuit 39 is configured of a permission signal holding unit 40, and a timing detection unit 60 that instructs the permission signal holding unit 40 of a timing of switching the permission signal S1. The permission signal holding unit 40 is configured of a comparator 42, transfer gates 44 and 46, an RS flip-flop 48, a D-type flip-flop 50, inverters 52 and 54, and a NOR gate 56, and generates and holds the permission signal S1 in accordance with a result of monitoring the alternating current input voltage.

Voltage signals of mutually differing sizes (1.60V and 1.35V) are input into the permission signal holding unit 40, and they are supplied to the inversion input terminal of the comparator 42 as the third reference voltage and fourth reference voltage via the transfer gates 44 and 46 respectively. Also, the non-inversion input terminal of the comparator 42, as well as being connected via a capacitor C4, is connected to the multiplier input terminal VDET via a resistor R7. The capacitor C4 and resistor R7 configure a filter circuit for removing a high-frequency noise caused by the switching operation of the switching element 6. In this way, the detected value Vdet of an alternating current input voltage proportional to the alternating current input voltage is supplied to the non-inversion input terminal of the comparator 42, and a monitoring circuit 40A that monitors the size of the alternating current input voltage is configured of the comparator 42 and the transfer gates 44 and 46.

An output signal Sa of the comparator 42 is supplied from the monitoring circuit 40A to one input terminal S of the RS flip-flop 48 as a result of the alternating current input voltage monitoring. Also, a one-shot signal S2 from the timing detection unit 60, to be described hereafter, is supplied to the other input terminal R of the RS flip-flop 48. The RS flip-flop 48 is such that, when a high (H) level signal is supplied to the input terminal S in a condition in which the one-shot signal S2 is at the L level, the same H level is output to an output terminal Q, the condition does not change even though the output signal Sa of the comparator 42 subsequently returns to the L level, and an output signal S3 of the output terminal Q is maintained at the H level. Also, in the RS flip-flop 48, when the other input terminal R is at the H level in a condition in which the output signal Sa of the comparator 42 input into the input terminal S is at the L level, the output signal S3 of the output terminal Q is inverted to the L level.

The permission signal holding unit 40 has a holding circuit 40B that, using the RS flip-flop 48, the D-type flip-flop 50, the inverters 52 and 54, and the NOR gate 56, generates and holds the permission signal S1 in accordance with the result of the monitoring of the alternating current input voltage by the monitoring circuit 40A. The output terminal Q of the RS flip-flop 48 is connected to a D input terminal of the D-type flip-flop 50, and the output signal S3 of the RS flip-flop 48 is loaded into the D-type flip-flop 50 in synchronization with a clock signal Ck supplied to a CK terminal of the D-type flip-flop 50. In the event that the output signal Sa of the comparator 42 reaches the H level between the previous loading in response to the clock signal Ck and the current loading in response to the clock signal Ck, the output signal S3 of the RS flip-flop 48 changes to the H level. That is, when the monitoring circuit 40A determines that the alternating current input voltage is high and the operation of the transient response corrector circuit should be prohibited, the output signal S3 of the output terminal Q of the RS flip-flop 48 changes to the H level, and unless the output signal Sa changes to the H level, the monitoring circuit 40A determines that the alternating current input voltage is low, and the output signal Sa will be at the L level.

An output terminal Q of the D-type flip-flop 50 of the holding circuit 40B is connected to a first control terminal of the transfer gate 44 and a second control terminal of the transfer gate 46 via the inverter 52. The output terminal of the inverter 52 is further connected to a second control terminal of the transfer gate 44 and a first control terminal of the transfer gate 46 via the inverter 54. Herein, when an H level signal is input into the first control terminal and an L level signal is input into the second control terminal, the transfer gates 44 and 46 attain a conduction state, attaining a condition in which the input signals can be forwarded to the output side. Also, the D-type flip-flop 50 is configured in such away that, its output terminal Q being connected to the NOR gate 56 via the inverters 52 and 54, it retrieves the output of the NOR gate 56 as the permission signal S1. In the NOR gate 56, an output signal of the inverter 54 being supplied to one input terminal thereof, and the output signal S3 of the RS flip-flop 48 being supplied to the other input terminal, a calculation of a negative OR of the two is carried out.

Because of this, when either the output signal from the output terminal Q of the D-type flip-flop 50 or the output signal S3 of the RS flip-flop 48 is at the H level, the permission signal S1 is an L level signal. That is, at a timing at which the output signal Sa of the comparator 42 attains the H level, the output signal S3 changes to the H level, and the permission signal S1 changes to the L level, after which, the H level of the output signal S3 is stored in the D-type flip-flop 50, and the L level of the permission signal S1 is maintained. Herein, as the permission signal S1 of the input voltage monitoring circuit 39 being at the L level means that it has been determined that the alternating current input voltage is too high, the operation of the transient response corrector circuit 38s is prohibited in this case, as will be described hereafter.

The monitoring circuit 40A configures a hysteresis comparator controlled by the outputs of the inverter 52 and the inverter 54 fixed by the output of the D-type flip-flop 50 of the holding circuit 40B. Herein, when the output of the D-type flip-flop 50 is at the L level, the transfer gate 44 has continuity, and the third reference voltage (1.60V) is input into the inversion input terminal of the comparator 42. In the event that the detected value Vdet of the alternating current input voltage exceeds the third reference voltage at this time, the output signal Sa of the comparator 42 changes to the H level, and the RS flip-flop 48 is set. Then, the output signal S3 of the RS flip-flop 48 changes to the H level, and this is loaded into the D-type flip-flop 50. Because of this, the output of the D-type flip-flop 50 changes to the H level, the transfer gate 46 now has continuity, and the fourth reference voltage (1.35V) is input into the inversion input terminal of the comparator 42. When it is not necessary to make the monitoring circuit 40A a hysteresis comparator, it is sufficient that one reference voltage is input into the inversion input terminal of the comparator 42 (this corresponds to the third reference voltage and fourth reference voltage being identical).

As will be described hereafter, the one-shot signal S2 is generated in the timing detection unit 60 immediately after the loading operation of the D-type flip-flop 50 in response to the clock signal Ck. The one-shot signal S2 is input into the RS flip-flop 48, and the RS flip-flop 48 is reset. Subsequently, even though the detected value Vdet of the alternating current input voltage goes below the third reference voltage (1.60V), the RS flip-flop 48 is reset again provided that the detected value Vdet exceeds the fourth reference voltage (1.35V), and its output signal S3 changes to the H level, meaning that the H level condition is maintained in the D-type flip-flop 50.

Meanwhile, in the event that the detected value Vdet of the alternating current input voltage does not exceed the fourth reference voltage (1.35V) between the RS flip-flop 48 being reset in response to the clock signal Ck and the next clock signal Ck being emitted, the output of the RS flip-flop 48 remains at the L level. Then, the output signal S3 is loaded into the D-type flip-flop 50, as a result of which the transfer gate 44 has continuity again, and the third reference voltage is input into the inversion input terminal of the comparator 42. Subsequently, even though the detected value Vdet of the alternating current input voltage goes above the fourth reference voltage (1.35V), the RS flip-flop 48 remains reset provided that the detected value Vdet does not exceed the third reference voltage (1.60V), meaning that the L level condition is maintained in the D-type flip-flop 50.

The timing detection unit 60 is configured of a comparison circuit 60A and a pulse generator circuit 60B, detects a timing at which the alternating current input voltage reaches the vicinity of the zero level, and instructs the permission signal holding unit 40 to update the output of the permission signal S1. That is, instruction is given for a timing of resetting the permission signal S1 by the D-type flip-flop 50 loading the output of the RS flip-flop 48 in the holding circuit 40B. The comparison circuit 60A is configured of a comparator 62, an inverter 64, and transfer gates 66 and 68. In the comparison circuit 60A, voltage signals of mutually differing sizes (0.30V and 0.35V) are input into the transfer gates 66 and 68, and they are supplied to the inversion input terminal of the comparator 62 as a fifth reference voltage and sixth reference voltage via the transfer gates 66 and 68 respectively.

In the comparison circuit 60A, the detected value Vdet of an alternating current input voltage proportional to the alternating current input voltage (the absolute value thereof) is supplied to the non-inversion input terminal of the comparator 62, and an output signal Sb of the comparator 62 is input into the pulse generator circuit 60B as a result of an alternating current input voltage monitoring. The pulse generator circuit 60B, based on the output signal Sb of the comparison circuit 60A, emits the clock signal Ck at a timing at which the detected value Vdet of the alternating current input voltage decreases as far as the fifth reference voltage (0.30V). At this time, the fifth reference voltage (0.30V) supplied to the comparison circuit 60A is set smaller than the third and fourth reference voltages, the alternating current input voltage is monitored with the fifth reference voltage (0.30V) as a reference, and the timing at which the alternating current input voltage reaches the vicinity of the zero level is determined.

In the comparison circuit 60A, the output terminal of the comparator 62 is connected to a first control terminal of the transfer gate 66 and a second control terminal of the transfer gate 68. The output terminal of the comparator 62 is further connected to a second control terminal of the transfer gate 66 and a first control terminal of the transfer gate 68 via the inverter 64. The comparator 62 is given hysteresis by the sixth reference voltage (0.35V) being set smaller than the third and fourth reference voltages (1.60V and 1.35V), and larger than the fifth reference voltage (0.30V). That is, when the output signal Sb of the comparator 62 is at the H level, the transfer gate 66 has continuity, and the fifth reference voltage (0.30V) is input into the inversion input terminal of the comparator 62. Also, when the output signal Sb of the comparator 62 is at the L level, the transfer gate 68 has continuity, and the sixth reference voltage (0.35V) is input into the inversion input terminal of the comparator 62. By means of this configuration, the detected value Vdet of the full-wave rectified alternating current input voltage decreases to near the vicinity of the zero level and, when it goes below the fifth reference voltage (0.30V), the output signal Sb of the comparator 62 inverts from the H level to the L level. Then, the decrease of the detected value Vdet of the full-wave rectified alternating current input voltage finishes and changes to an increase, and when its value exceeds the sixth reference voltage (0.35V), the output signal Sb of the comparator 62 inverts from the L level to the H level. That is, in the comparison circuit 60A, when the detected value Vdet of the full-wave rectified alternating current input voltage reaches the vicinity of the zero level, the L level short pulse output signal Sb is output from the comparator 62.

The pulse generator circuit 60B is configured of an inverter 70, an N-channel type MOSFET 72, a constant current source 74, a capacitor C5, inverters 76 and 78, and a NOR gate 80. Herein, the clock signal Ck is generated by the output signal Sb of the comparison circuit 60A being inverted by the inverter 70. The clock signal Ck is supplied to the gate terminal of the N-channel type MOSFET 72, one input terminal of the NOR gate 80, and the CK terminal of the D-type flip-flop 50 of the permission signal holding unit 40.

The N-channel type MOSFET 72 and constant current source 74 are connected in series between a power source Vcc and the ground. The connection point of the drain terminal of the MOSFET 72 and constant current source 74 is connected to the input terminal of the inverter 76. Also, the connection point of the drain terminal of the MOSFET 72 and constant current source 74 is grounded via the capacitor C5. The constant current source 74 and capacitor C5 configure an integrating circuit, and perform a function of delaying and transmitting the decay of the clock signal Ck. That is, on the clock signal Ck decaying, the MOSFET 72 is turned off (cut off), and an integrating of the constant current of the constant current source 74 by the capacitor C5 is started. Then, on an integrated voltage of the capacitor C5 (the voltage at either end of the capacitor C5) reaching a threshold voltage of the inverter 76, the output of the inverter 76 inverts from the H level to the L level, and it is at this time that the decay of the clock signal Ck is first transmitted to the inverter 78. Also, on the clock signal Ck rising, the MOSFET 72 is turned on (has continuity), the capacitor C5 is immediately discharged, and the outputs of the inverters 76 and 78 change to the H level and L level respectively. An output signal of the inverter 78 is input into the other input terminal of the NOR gate 80.

In this way, a calculation of a negative OR of the clock signal Ck and an output of the inverter 78 fixed by a voltage Vd of the drain terminal of the MOSFET 72 is carried out in the NOR gate 80. Consequently, as one input (the clock signal Ck) of the NOR gate 80 is at the H level when the clock signal Ck is at the H level, the output of the NOR gate 80 is constantly at the L level. Meanwhile, on the clock signal Ck decaying from the H level to the L level, the integrated voltage of the capacitor C5 immediately after does not reach the threshold voltage of the inverter 76, meaning that, as the two inputs of the NOR gate 80 are both at the L level, the output of the NOR gate 80 changes to the H level. Subsequently, as the output of the inverter 78 changes to the H level on the integrated voltage of the capacitor C5 reaching the threshold voltage of the inverter 76, the output of the NOR gate 80 changes to the L level. Consequently, the H level one-shot signal S2 having a duration determined by the constant current 74, the capacitor C5, and the threshold voltage of the inverter 76 is generated in the NOR gate 80, and output in synchronization with the decay of the clock signal Ck.

As heretofore described, when the detected value Vdet of the full-wave rectified alternating current input voltage reaches the vicinity of the zero level, the L level short pulse signal Sb is output from the comparator 62, at which time the clock signal Ck changes to an H level short pulse signal wherein the signal Sb is inverted. The D-type flip-flop 50 of the holding circuit 40B carries out a loading operation at the rise of the clock signal Ck, and the RS flip-flop 48 is reset by the one-shot signal S2 synchronized with the decay of the clock signal Ck. By this means, on a half-cycle of the alternating current input voltage finishing and the detected value Vdet of the alternating current input voltage reaching the vicinity of the zero level, firstly, the condition of the RS flip-flop 48 is stored in the D-type flip-flop 50, immediately after which the RS flip-flop 48 is reset in readiness for the output signal Sa from the monitoring circuit 40A in the next half-cycle.

Next, a description will be given of the transient response corrector circuit 38s that corrects the transient response characteristics when the input voltage monitoring circuit 39 receives the detected value Vdet of the alternating current input voltage proportional to the alternating current input voltage and generates the permission signal S1.

Figure 3:
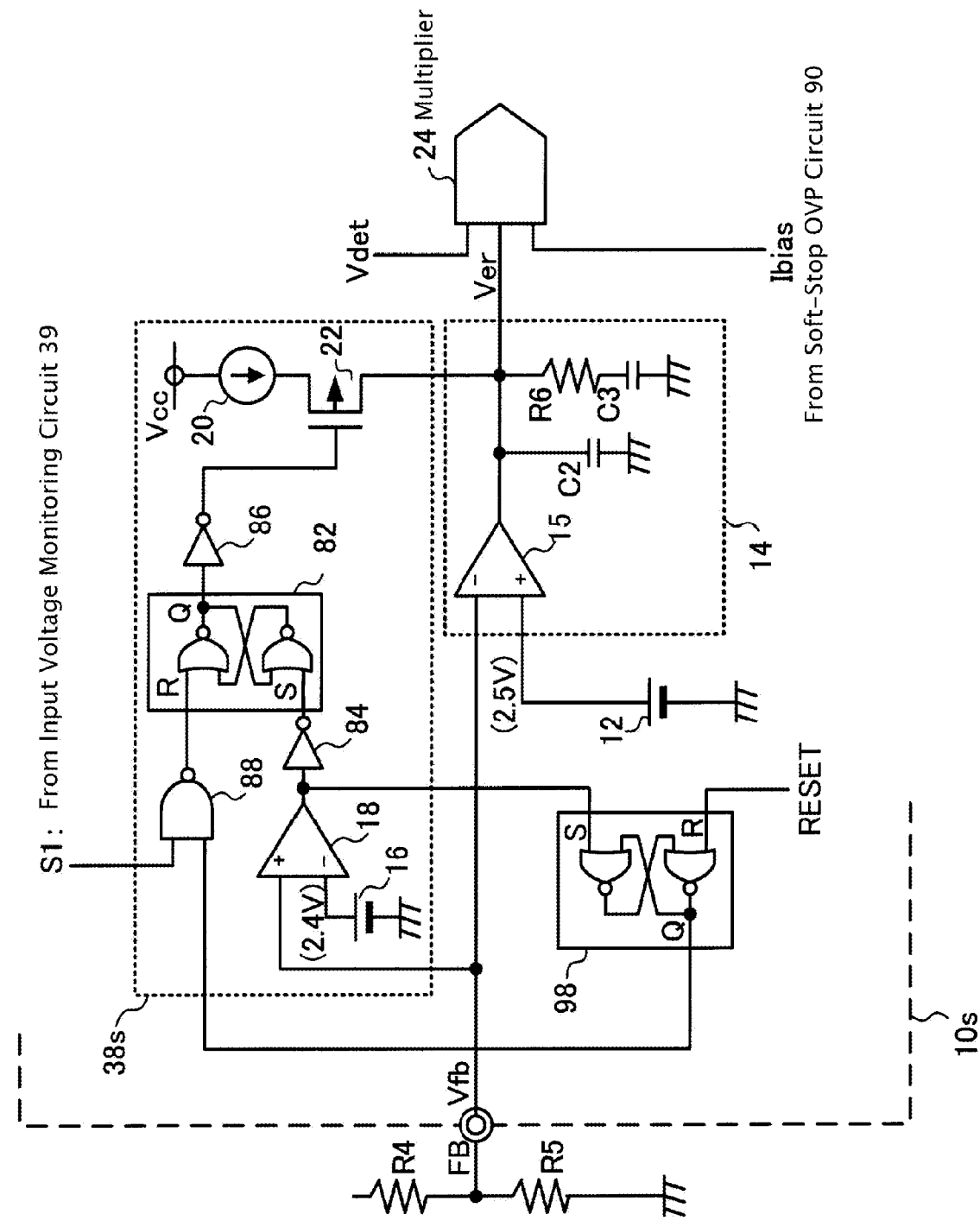
FIG. 3 is a circuit diagram showing one example of a specific configuration of a transient response corrector circuit.

FIG. 3 is a circuit diagram showing one example of a specific configuration of a transient response corrector circuit.

The transient response corrector circuit 38s, unlike the heretofore known transient response corrector circuit 38 shown in FIG. 12, has a circuit formed of a flip-flop circuit 82, inverters 84 and 86, and a NAND gate 88 interposed between a comparator 18 and a P-channel type MOSFET 22. The output terminal of the comparator 18 is connected via the inverter 84 to a set input terminal S of the flip-flop circuit 82, and the permission signal S1 from the input voltage monitoring circuit 39 is supplied via the NAND gate 88 to a reset input terminal R of the flip-flop circuit 82. Although the output of a flip-flop circuit 98, to be described hereafter, is also input into the NAND gate 88, it will be taken here that the output of the flip-flop circuit 98 is at the H level. Then, an output terminal Q of the flip-flop circuit 82 is connected via the inverter 86 to the gate terminal of the MOSFET 22.

When the permission signal S1 from the input voltage monitoring circuit 39 is at the H level, the transient response corrector circuit 38s is in a condition in which no reset signal is being input into the flip-flop circuit 82. On the feedback voltage from the feedback voltage input terminal FB decreasing and reaching the second reference voltage (2.4V), which is the output of the reference voltage source 16, in this condition, a set signal is input into the flip-flop circuit 82, and a signal Q (signals and terminals are given the same reference numerals and characters) from the output terminal Q of the flip-flop circuit 82 changes to the H level. Consequently, as the signal Q is inverted in the inverter 86, changes to an L level signal, and is applied to the gate terminal of the MOSFET 22, the MOSFET 22 is turned on (has continuity). In this way, the current from the constant current source 20 is injected into the capacitor C2 of the voltage error amplifier circuit 14, and the voltage error signal Ver, which is the voltage at either end of the capacitor C2, is compulsorily increased. The constant current source 20 may be replaced with another circuit element, such as a resistor, having a function of a current source that injects a limited current (it need not be constant) into the capacitor C2 when the MOSFET 22 is turned on.

Conversely, when the permission signal S1 from the input voltage monitoring circuit 39 is at the L level, the flip-flop circuit 82 maintains the reset condition. In this case, whatever the output level of the comparator 18, that is, even though the output voltage to a load 8 decreases, the output terminal Q of the flip-flop circuit 82 is maintained at the L level, meaning that the gate terminal of the MOSFET 22 changes to the H level. Therefore, the MOSFET 22 is turned off, and no current flows into the capacitor C2 of the voltage error amplifier circuit 14. That is, the operation of the transient response corrector circuit 38s is prohibited. Consequently, the output increase operation is permitted or prohibited in the transient response corrector circuit 38s in accordance with the permission signal S1 from the input voltage monitoring circuit 39.

Next, a description will be given of the soft-stop overvoltage protection circuit 90 and its soft-stop OVP function.

Figure 4:
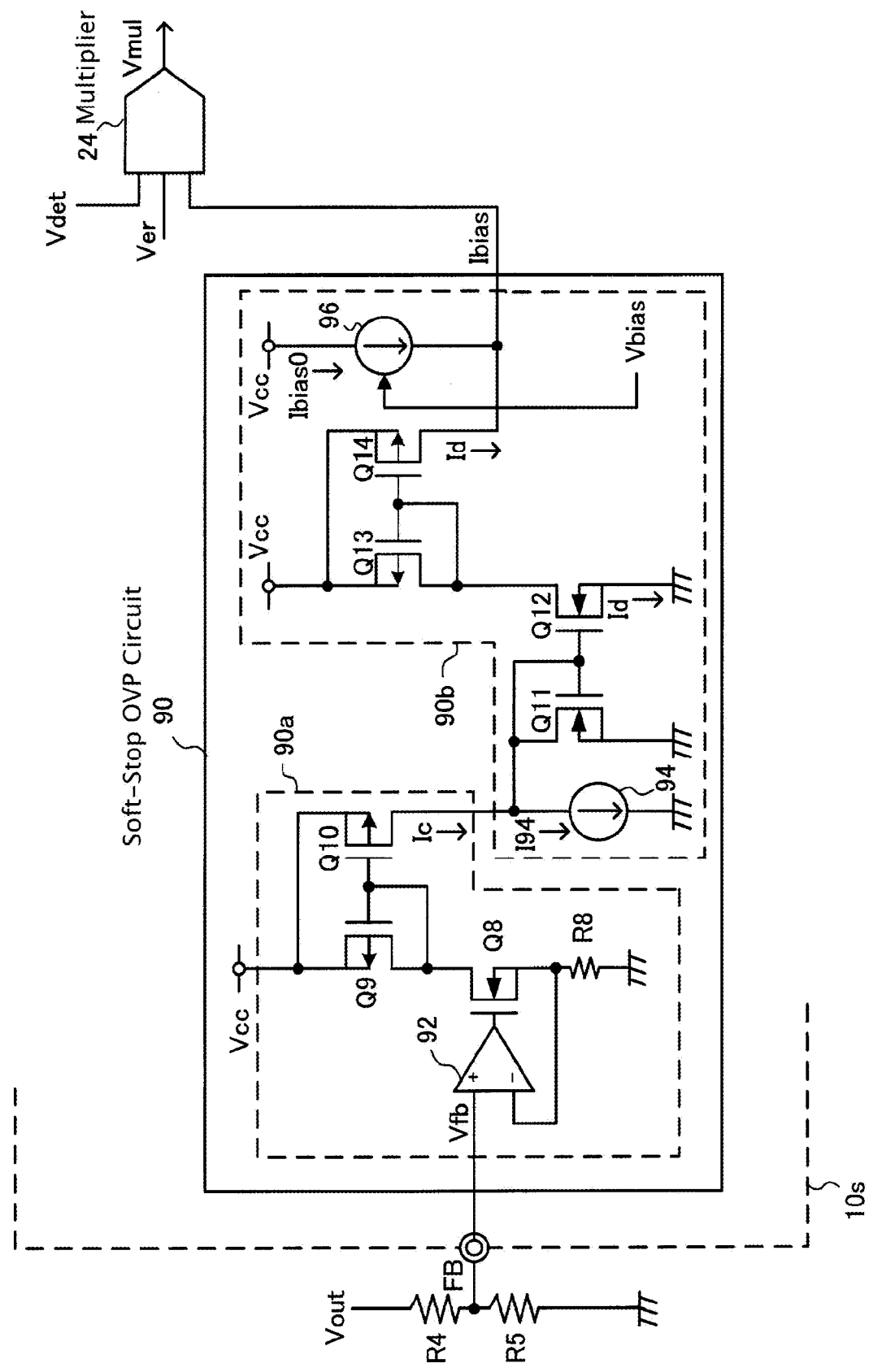
FIG. 4 is a circuit diagram showing a specific configuration of a soft-stop overvoltage protection circuit having a soft-stop OVP function.

FIG. 4 is a circuit diagram showing a specific configuration of a soft-stop overvoltage protection circuit having a soft-stop OVP function.

The soft-stop overvoltage protection circuit (hereafter called the soft-stop OVP circuit) 90 is configured of a voltage detection unit 90a and a signal output unit 90b. The voltage detection unit 90a detects the soft-stop overvoltage detection voltage (hereafter also called the soft-stop OVP voltage signal) Vfb input from the feedback voltage input terminal FB, and converts it into a current signal. The signal output unit 90b, based on the current signal, generates a bias current as a gain adjustment signal, and inputs it into the multiplier 24.

The voltage detection unit 90a is configured of an operational amplifier 92, whose non-inversion input terminal is connected to the feedback voltage input terminal FB, a resistor R8, one end of which is grounded, and MOS transistors Q8 to Q10. The inversion input terminal of the operational amplifier 92 is connected to the connection point of the resistor R8 and MOS transistor Q8, and its output terminal is connected to the gate terminal of the MOS transistor Q8. The drain terminal of the MOS transistor Q8 is connected to the power source Vcc via the separate MOS transistor Q9. The source terminal of the MOS transistor Q8 is grounded via the resistor R8. As the two input terminals of the operational amplifier 92 are in an imaginary short state (hypothetically short-circuited), the potential of the connection point of the MOS transistor Q8 and resistor R8 is equivalent to the divided voltage value of the direct current output voltage Vout input into the feedback voltage input terminal FB, that is, the soft-stop OVP voltage signal Vfb. For this reason, a current proportional to the soft-stop OVP voltage signal Vfb flows through the resistor R8.

Also, the MOS transistors Q9 and Q10 configure a current mirror circuit. Consequently, an overvoltage prevention current Ic proportional to the soft-stop OVP voltage signal Vfb is input from the source terminal of the MOS transistor Q10 into the signal output unit 90b.

The signal output unit 90b is configured of constant current sources 94 and 96, and four MOS transistors Q11 to Q14. Herein, a former stage current mirror circuit is configured by the MOS transistors Q11 and Q12, and a latter stage current mirror circuit is configured by the MOS transistors Q13 and Q14.

In the former stage current mirror circuit, the constant current source 94 is provided in parallel with the input side MOS transistor Q11, and the overvoltage prevention current Ic supplied from the voltage detection unit 90a flows in such a way that the current is divided between the constant current source 94 and the drain terminal of the MOS transistor Q11. Also, in the latter stage current mirror circuit, the constant current source 96 is provided in parallel with the output side MOS transistor Q14. The constant voltage signal Vbias generated by an unshown circuit is input into the constant current source 96 as a control signal, and the size of the constant current Ibias of the constant current source 96 is determined by the constant voltage signal Vbias. A constant current value I94 of the constant current source 94 is a current value corresponding to the first threshold value with respect to the soft-stop overvoltage detection voltage Vfb, and a threshold value current value that determines the soft-stop OVP is regulated by the constant current source 94. When the overvoltage prevention current Ic flows in excess of the constant current value I94, an overvoltage prevention signal Id, which is a current signal fluctuating by a size proportional to the difference between the Ic and I94, is output from the latter stage current mirror circuit. Then, the bias current Ibias, wherein the overvoltage prevention signal Id is added to a constant current Ibias0, is supplied from the constant current source 96 to the multiplier 24.

In this way, the bias current Ibias is supplied to the multiplier 24 as a gain adjustment signal, as well as which the voltage error signal Ver, which is the first input signal, and the second input signal Vdet corresponding to the detected value (the divided voltage value) of the output voltage of the full-wave rectifier 4 are input. Although details of the configuration and operation of the multiplier 24 will be given hereafter, the multiplier 24 operates in such a way as to carry out a multiplication of the first and second input signals, and furthermore, to divide the result by the bias current Ibias. That is, the gain of the multiplier 24 changes in inverse proportion to the bias current Ibias, wherein the overvoltage prevention signal Id of the soft-stop OVP circuit 90 is added to the constant current Ibias0 from the constant current source 96, as heretofore described. Therefore, on the soft-stop OVP voltage signal Vfb increasing and the soft-stop OVP function operating, it is possible to increase the bias current Ibias, and reduce the current reference signal Vmul input into the non-inversion input terminal of the current error amplifier circuit 26. Because of this, it is possible to prevent an excessive rise of the inductor current $I_L$ and direct current output voltage Vout.

Also, in the power factor correction control circuit 10s according to the embodiment, the transient response corrector circuit 38s and soft-stop OVP circuit 90 are combined, and furthermore, the value of the soft-stop OVP voltage signal Vfb at which the soft-stop OVP function starts to work is set lower than the value of the soft-stop OVP voltage signal Vfb at which the overvoltage protection (OVP) function, which stops the switching, starts to work. By so doing, it is possible to solve the problem with the heretofore known power factor correction type switching power supply unit when correcting the transient response characteristics. That is, when the inductor current $I_L$ and direct current output voltage Vout start to rise due to the transient response corrector circuit 38s, by the soft-stop overvoltage protection circuit 90 operating, suppressing the rise, before the overvoltage protection circuit 100 starts to work, it is possible to prevent an excessive rise of the inductor current $I_L$ and direct current output voltage Vout, and prevent a repetition of switching stopped→output reduction→switching restart with OVP omitted→output increase→overshoot→switching operation stopped by OVP function.

Next, a description will be given of an analog multiplier usable in the power factor correction control circuit 10s.

Figure 5:
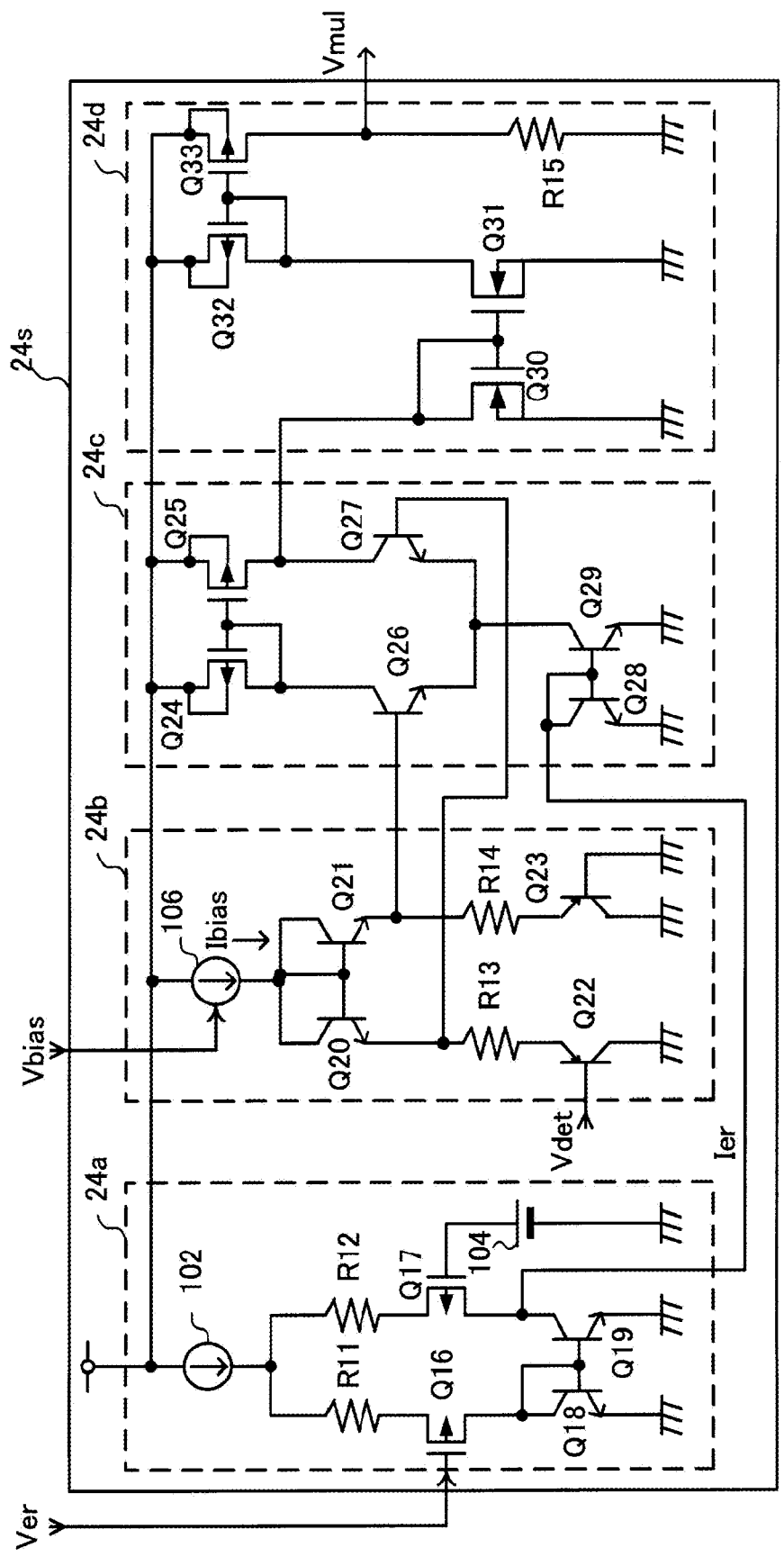
FIG. 5 is a circuit diagram showing an analog multiplier, which is an example of a case of a multiplier being configured with an analog circuit.

FIG. 5 is a circuit diagram showing an analog multiplier, which is an example of a case of a multiplier being configured with an analog circuit.

An analog multiplier 24s is configured of a V/I conversion unit 24a, a signal input unit 24b, a calculation unit 24c, and a signal output unit 24d. The voltage signal Vmul corresponding to a value which is the product of the voltage error signal Ver, which is the first input signal, and the detected value Vdet of the alternating current input voltage, which is the second input signal, divided by the bias current Ibias, which is also a gain adjustment current signal, is output from the signal output unit 24d. The V/I conversion unit 24a has a constant current source 102, resistors R11 and R12, MOS transistors Q16 and Q17 forming a first differential pair, a reference voltage source 104, and NPN-type bipolar transistors Q18 and Q19 configuring a first current mirror circuit. Herein, the first input signal (voltage error signal) Ver stipulating a current signal Ier is input into the gate terminal of the MOS transistor Q16.

The signal input unit 24b, having a constant current source 106, NPN-type bipolar transistors Q20 and Q21 configuring a transistor pair, PNP-type bipolar transistors Q22 and Q23 forming a second differential pair, and resistors R13 and R14, configures a differential circuit. The constant current source 106 generates the bias current Ibias, and is configured specifically of the soft-stop overvoltage protection circuit (soft-stop OVP circuit) 90 shown in FIG. 4, or the like. In the signal input portion 24b, the bias current Ibias, which also performs a gain adjustment function, is supplied from the constant current source 106. The base terminal of the bipolar transistor Q22 is connected to the multiplier input terminal VDET, the detected value Vdet of the alternating current input voltage, which is the second input signal, is input, the signal input unit 24b compares this with a ground potential (the GND potential) as the differential circuit, and the differential output thereof is input into the calculation unit 24c of the next stage.

The calculation unit 24c has MOS transistors Q24 and Q25 configuring a second current mirror circuit, NPN-type bipolar transistors Q26 and Q27 forming a third differential pair, and NPN-type bipolar transistors Q28 and Q29 configuring a third current mirror circuit. Herein, the current signal Ier from the V/I conversion unit 24a is input into the third current mirror circuit, and the differential output of the signal input unit 24b is input into the base terminal of the third differential pair.

The signal output unit 24d has MOS transistors Q30 and Q31 configuring a fourth current mirror circuit, MOS transistors Q32 and Q33 configuring a fifth current mirror circuit, and an output resistor R15. In the signal output unit 24d, a current signal output from the calculation unit 24c is supplied to the MOS transistor Q30 on the input side of the fourth current mirror circuit. Then, the voltage signal Vmul of the connection point of the drain terminal of the MOS transistor Q33 on the output side of the fifth current mirror circuit and the resistor R15 is output as a multiplication result of the analog multiplier 24s.

Generally, the collector current Ic stipulated by the following Equation 1 flows in the bipolar transistors.

$$Ic = Io \times \exp(Vbe/Vt) \qquad 1$$

Io is a reverse collector saturation current and Vt a thermal voltage (=kT/q), both being constants, and Vbe is an inter-base emitter voltage value.

Now, in the signal input portion 24b, the inter-base emitter voltage values of the bipolar transistors Q20 and Q21 are V20 and V21 respectively, and the collector currents I20 and I21 respectively. An inter-emitter potential difference $\Delta V1$ of the bipolar transistors Q20 and Q21 forming a working pair is $$\Delta V1 = V21 - V20 \qquad 2.$$

Furthermore, when rewriting Equation 1 for Vbe, it becomes $$Vbe = Vt \times \ln(Ic/Io) \qquad 3,$$

meaning that Equation 2 can be expressed as follows.

$$\Delta V1 = Vt \times \ln(I21/Io) - Vt \times \ln(I20/Io) \qquad 4$$
$$= Vt \times \ln(I21/I20)$$

In the same way, when the collector currents are I26 and I27 respectively, and the inter-base emitter voltage values V26 and V27 respectively, in the bipolar transistors Q26 and Q27 of the calculation unit 24c, Equation 5 is established for an inter-base potential difference $\Delta V2$ of the bipolar transistors Q26 and Q27.

$$\Delta V2 = Vt \times \ln(I26/I27) \qquad 5$$

In the bipolar transistors Q20 and Q21, and Q26 and Q27, as the inter-base emitter potential differences $\Delta V1$ and $\Delta V2$ are equivalent, the following relationship is established between the collector currents I20 and I21, and I26 and I27.

$$(I26/I27) = (I21/I20) \qquad 6$$

When a/b=c/d, as (a−b)/(a+b)=(c−d)/(c+d), Equation 6 can be rewritten as the following Equation 7.

$$(I26-I27)/(I26+I27) = (I21-I20)/(I21+I20) \qquad 7$$

In the calculation unit 24c, the difference (=I26−I27) between the collector currents of the bipolar transistors Q26 and Q27 becomes a current output Iout to the signal output unit 24d. Therefore, when I21+I20 is I1, I26+I27 is I2, and I21−I20 is $\Delta i$, Equation 7 can be rewritten as $$Iout = I2 \times \Delta i / I1 \qquad 8.$$

That is, it can be seen that the calculation unit 24c functions as a multiplier of $I2 \times \Delta i$, and also functions as a divider of I1.

Consequently, in the analog multiplier 24s, the size of I2 (=I26+I27) is determined by the current signal Ier stipulated by the voltage error signal Ver input into the V/I conversion unit 24a. Also, the size of Δi (=I21−I20) is determined by the second input signal Vdet applied to the base terminal of the bipolar transmitter Q22, and the size of the bias current Ibias, which is I1 (=I21+I20), is determined by the control signal (Vbias) in the constant current source 106 of the signal input unit 24b. As a result of this, the voltage signal Vmul, which is the output of the analog multiplier 24s, is of a size corresponding to a quotient wherein the product of the first input signal (the voltage error signal) Ver and second input signal (the detected value of the alternating current input voltage) Vdet is divided by the bias current Ibias. As the bipolar transistors Q22 and Q23 function as emitter followers, and ΔV1 (=V21−V20) is small, when this is ignored, Δi is proportional to the second input signal Vdet.

FIGS. 6A to 6D are timing diagrams for illustrating an operation of a transient response correction circuit when there is a sudden increase in load.

Now, a case will be considered wherein the load current shown in FIG. 6A begins to increase at a time t0 but, unable to deal with the suddenly increased load, the detected value Vfb of the output voltage Vout shown in FIG. 6B simultaneously begins to decrease. A waveform of the voltage error signal Ver output to the multiplier 24 is shown in FIG. 6C. Herein, on the output voltage Vout decreasing, and the feedback voltage (the soft-stop overvoltage detection voltage) Vfb from the feedback voltage input terminal FB becoming equal to or lower than the second reference voltage (2.4V) at a time t1, the output of the comparator 18 decays, and it is determined in the transient response corrector circuit 38s that there is a decrease in the direct current output power. On the comparator 18 inverting, the constant current from the constant current source 20 is applied to the capacitor C2 connected to the output side of the voltage error amplifier circuit 14 (it is taken that the permission signal S1 from the input voltage monitoring circuit 39 is at the H level). The injection of the constant current into the capacitor C2 continues until a time t2 at which the soft-stop overvoltage detection voltage Vfb again reaches the second reference voltage (2.4V), during which time the capacitor C2 is rapidly charged, the on duty spreads, and the speed at which the load voltage Vout rises is increased.

Then, at a time t3 at which the soft-stop overvoltage detection voltage Vfb increases in excess of a threshold value (the first threshold value) Vth1 of the soft-stop overvoltage protection circuit 90, the operation of the soft-stop overvoltage protection circuit 90 is started, and it is possible to narrow the on duty in order that the load voltage Vout does not rise too far. The operation of the soft-stop overvoltage protection circuit 90 is continued until a time t4 at which the soft-stop overvoltage detection voltage Vfb decreases as far as the threshold value (the first threshold value) Vth1 of the soft-stop overvoltage protection circuit 90. Also, by setting the threshold value of the soft-stop overvoltage protection circuit 90 to a value lower than the threshold value of the overvoltage protection circuit 100, it is also possible to prevent a squeaking during the overvoltage protection operation.

Also, as the on duty is narrowed gently by the soft-stop overvoltage protection operation, and the rise of the load voltage Vout is suppressed, it is possible to bring the output voltage Vout near to a desired value without a repeated decrease and rise of the output voltage, even when there is the kind of sudden increase in load of FIGS. 6A to 6D.

FIGS. 7A and 7B are timing diagrams for illustrating an operation of the transient response correction circuit at a start-up time of the power factor correction control circuit.

In FIGS. 7A and 7B, the feedback voltage (the soft-stop overvoltage detection voltage) Vfb from the feedback voltage input terminal FB starts to rise from zero at the start-up time (at or before a time t10) of the power factor correction control circuit 10s. Now, it will be taken that a reset signal RESET is supplied at the start-up time from a control circuit not shown in FIG. 1, and that the flip-flop circuit 98 shown in FIG. 3 is put into a reset condition. Because of this, the L level signal Q is input from the flip-flop circuit 98 into the NAND gate 88 of the transient response corrector circuit 38s, and it is possible to maintain the flip-flop circuit 82 in the reset condition. Consequently, it is possible to prohibit the operation of the transient response corrector circuit 38s in a condition in which the soft-stop overvoltage detection voltage Vfb is low immediately after the start-up. The prohibiting of the operation of the transient response corrector circuit 38s is continued until the soft-stop overvoltage detection voltage Vfb reaches the second reference voltage (2.4V), the output of the comparator 18 changes to the H level, the flip-flop circuit 98 is set, and its output changes to the H level.

FIGS. 8A and 8B are diagrams showing a change in alternating current input voltage, and a permission signal for a corresponding transient response correction.

FIG. 8A shows a waveform corresponding to the detected value Vdet proportional to the alternating current input voltage (the absolute value thereof), with the peak voltage value differing in each of an A period, a B period, a C period, and a D period.

In the A period, although the peak voltage value of the detected value Vdet of the alternating current input voltage is below the third reference voltage (1.6V), it exceeds the 1.35V set as the fourth reference voltage. For this reason, the permission signal S1 is maintained at the H level without inverting, and the permission signal S1 is sent to the transient response corrector circuit 38s.

In the B period, the peak voltage value of the detected value Vdet of the alternating current input voltage exceeds the 1.6V set as the third reference voltage. In this kind of case, it is determined that the alternating current input voltage is high, the permission signal S1 output to the transient response corrector circuit 38s is changed from the H level to the L level at a timing (a time t21) at which the detected value Vdet of the alternating current input voltage exceeds 1.6V, and the transient response correction operation is prohibited.

In the C period, although the peak voltage value of the detected value Vdet is below the third reference voltage (1.6V), it exceeds the 1.35V set as the fourth reference voltage. For this reason, the permission signal S1 is maintained at the L level without inverting, and the permission signal is not sent to the transient response corrector circuit 38s.

Entering the D period, on the peak voltage value of the detected value Vdet going below the fourth reference voltage (1.35V), the permission signal S1 is changed from the L level to the H level at a timing (a time t22) at which the detected value Vdet reaches 0.3V, which is the fifth reference voltage. Then, by the permission signal S1 changing to the H level, the transient response correction operation in the transient response corrector circuit 38s is permitted. The timing at which the permission signal S1 is inverted to the H level is set where the phase angle of the alternating current input voltage is low in order that the inductor current does not change sharply.

In this way, the detection of the alternating current input voltage in the input voltage monitoring circuit 39 of FIG. 2 is such that it is determined that the alternating current input voltage is high when the peak value of the alternating current input voltage is equal to or higher than a certain threshold value, and the permission signal S1 is decided on.

In the input voltage monitoring circuit 39 of FIG. 2, the detected value Vdet proportional to the alternating current input voltage is input into the monitoring circuit 40A of the permission signal holding unit 40, and its peak value is monitored, but it is also possible to monitor the average voltage value of the alternating current input voltage with the monitoring circuit. In this case, it is sufficient that the detected value Vdet is input into an averaging circuit (for example, a series circuit of an amplifier and a low pass filter), and the output of the averaging circuit is input in place of the detected value Vdet of the alternating current input voltage into the comparator 42 shown in FIG. 2. In this case, the values of the third reference voltage and fourth reference voltage are reviewed.

FIGS. 9A to 9C are diagrams showing a permission signal for a transient response correction corresponding to a change in average input voltage of an alternating current input.

Herein, the permission signal S1 (FIG. 9C) for the transient response correction is inverted to the L level at a timing t31 at which the average voltage of the alternating current input voltage shown in FIG. 9B is equal to or higher than a threshold value Vth3 (a voltage equivalent to the third reference voltage in the case of the detected value Vdet of the alternating current input voltage being input into the comparator 42). Because of this, when the alternating current input voltage is high, it is possible to not allow the transient response correction operation to function, even though the soft-stop overvoltage detection voltage Vfb is equal to or lower than the second reference voltage (2.4V) of the transient response corrector circuit 38s.

Second Embodiment

Figure 10:
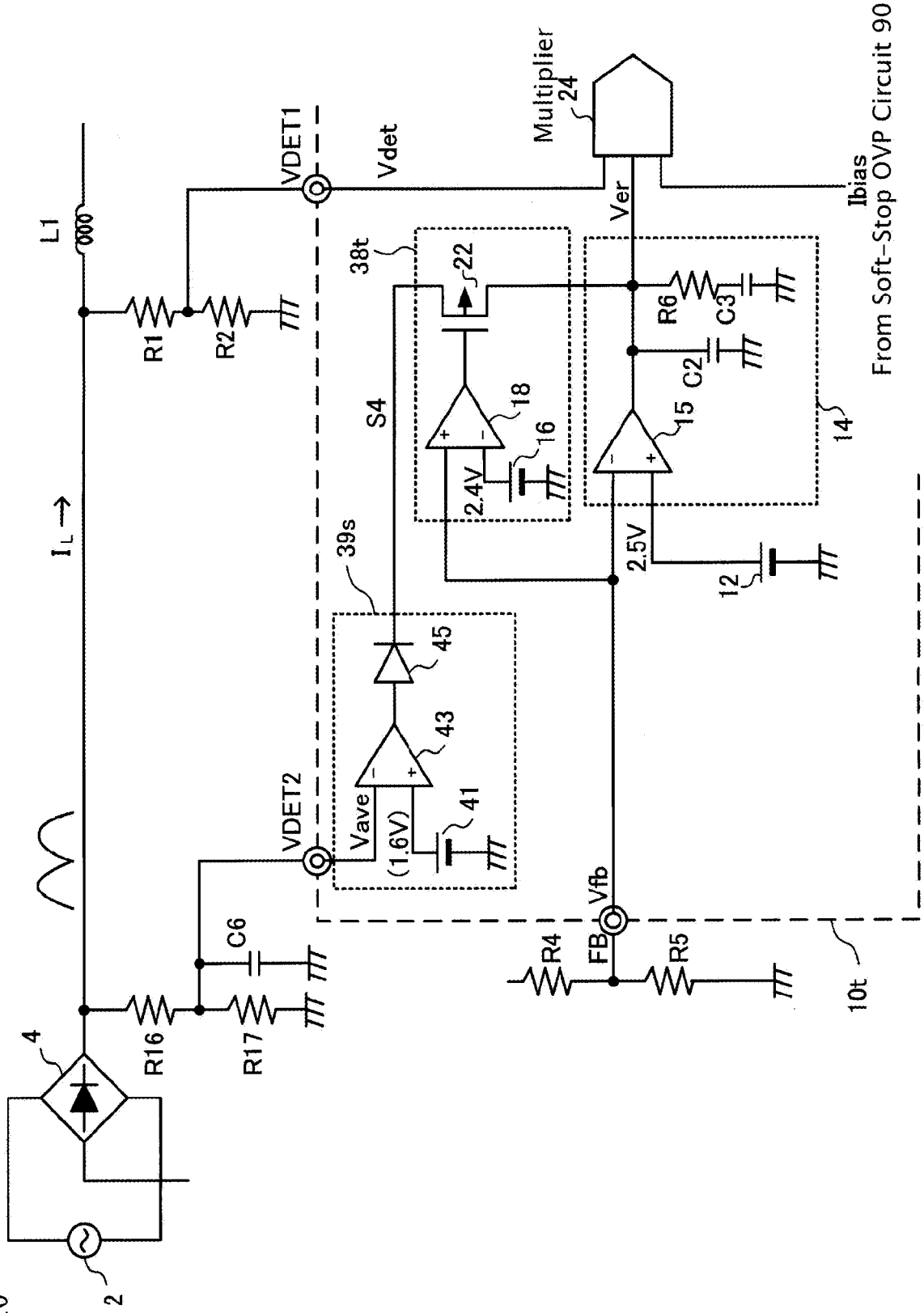
FIG. 10 is a circuit diagram showing a configuration of a power factor correction control circuit according to a second embodiment of the invention.

Next, a description will be given of a power factor correction type switching power supply unit according to a second embodiment of the invention. FIG. 10 is a circuit diagram showing a configuration of a power factor correction control circuit according to the second embodiment of the invention. Here too, the configuration is the same as that of the heretofore known power factor correction type switching power supply unit shown in FIG. 12, except that the power factor correction control circuit 10 is replaced with a power factor correction control circuit 10t.

The power factor correction control circuit 10t is one that controls a current flowing to an alternating current commercial power supply 2 side into a sinusoidal wave in the same phase as that of an alternating current input voltage, while stabilizing a direct current output voltage Vout, and its feedback voltage input terminal FB is connected to one input terminal (the inversion input terminal) of an OTA 15. A reference voltage source 12 that sets a voltage command value (a first reference voltage: for example, 2.5V) for the direct current output voltage Vout is connected to the other input terminal (the non-inversion input terminal) of the OTA 15. A voltage error amplifier circuit 14 is configured of the OTA 15, which converts a voltage signal into a current signal, as well as a capacitor C2 for converting a current from the OTA 15 into a voltage, and a series circuit of a resistor R6 and capacitor C3 for phase compensation, each connected between the output terminal of the OTA 15 and a GND. The voltage error amplifier circuit 14 generates a voltage error signal Ver wherein the difference between the detected value of the direct current output voltage Vout and the voltage command value of the reference voltage source 12 is amplified. The voltage error signal Ver is a voltage at either end of the capacitor C2, is compulsorily increased by a current signal from a transient response corrector circuit 38t at a time of a transient response characteristic correction, and is supplied to a first input terminal of a multiplier 24.

One end of a series resistance circuit formed of resistors R1 and R2 is connected to the connection point of a full-wave rectifier 4 and an inductor L1, and the other end is grounded. In the power factor correction control circuit 10t, its multiplier input terminal VDET1 and a second input terminal of the multiplier 24 are connected, and a detected value (a divided voltage value in this case) Vdet of an output voltage of the full-wave rectifier 4 is input from here into the multiplier 24. Also, a bias current Ibias generated based on a soft-stop overvoltage detection voltage proportional to the direct current output voltage is supplied from the soft-stop overvoltage protection circuit 90 shown in FIG. 4 to the multiplier 24.

One end of a series resistance circuit formed of resistors R16 and R17 is also connected to the connection point of the full-wave rectifier 4 and inductor L1 and, as well as the other end being grounded, a capacitor C6 is provided in parallel with the resistor R17. An input terminal VDET2 of the power factor correction control circuit 10t is a terminal into which is input an average value voltage Vave, which is a signal representing the average value of an alternating current input voltage full-wave rectified by the full-wave rectifier 4, and the connection point of the resistors R16 and R17 is connected to the input terminal VDET2.

The transient response corrector circuit 38t is configured of a reference voltage source 16, a comparator 18, and a P-channel type MOSFET 22, and a second reference voltage lower than 2.5V (for example, 2.4V), which is the value of a voltage command to the voltage error amplifier circuit 14, is output from the reference voltage source 16 to the comparator 18. Then, provided that a detected value Vfb of the direct current output voltage Vout is equal to or lower than the second reference voltage, the MOSFET 22 is turned on, and the output of the voltage error amplifier circuit 14 is compulsorily increased, thus correcting the transient response characteristics.

Also, the input voltage monitoring circuit 39s is connected to the input terminal VDET2, separate from the multiplier input terminal VDET1, and the average value voltage Vave representing the average value of the alternating current input voltage is supplied to the inversion input terminal of an OTA 43 configuring the input voltage monitoring circuit 39s. A reference voltage source 41, of which one end is grounded, is connected to the non-inversion input terminal of the OTA 43, and the output terminal of the reference voltage source 41 is connected via a diode 45 to the MOSFET 22 of the transient response corrector circuit 38t. Herein, the input voltage monitoring circuit 39s operates in such a way as to turn the diode 45 on (having continuity) or off (not having continuity), and output a permission signal S4 for correcting the transient response characteristics to the transient response corrector circuit 38t, while comparing the average value voltage Vave with a seventh reference voltage (for example, 1.6V, the same as the third reference voltage). The permission signal S4 in this case is formed by a current being expelled from the diode 45 only when the average value voltage Vave is lower than the seventh reference voltage, and moreover, it is output as a current value whose size increases the smaller the value of the average value voltage Vave becomes.

With the input voltage monitoring circuit 39s, it is possible to adjust the size of the seventh reference voltage set by the reference voltage source 41, and the resistance values of the serial resistors R16 and R17, and increase the output of the voltage error amplifier circuit 14 in accordance with the average value of the alternating current input voltage supplied from the commercial power supply 2. That is, the input voltage monitoring circuit 39s functions in such a way as to change the correction effect of the transient response corrector circuit 38t in such a way that it becomes continuously smaller when the average value of the alternating current input voltage is high, and when the average value is equal to or higher than the reference voltage (1.6V in this case), prohibit the transient response correction operation.

A multiplication result of the multiplier 24 is output as a current reference signal Vmul to the non-inversion input terminal of a current error amplifier circuit 26, but a PWM control signal to a switching element 6 in the power factor correction control circuit 10t generated by the current reference signal Vmul is the same as in the case of the first embodiment.

Third Embodiment

Figure 11:
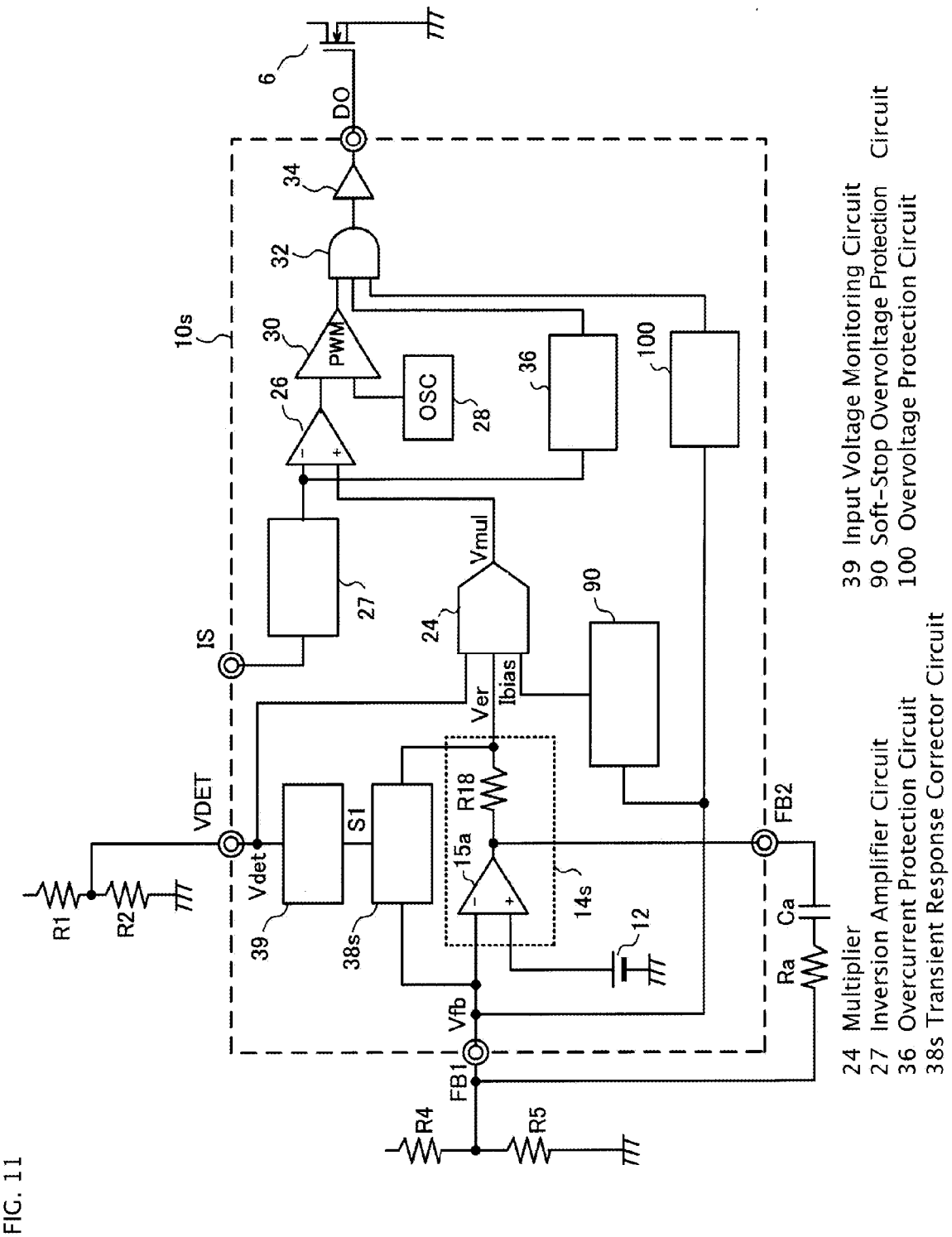
FIG. 11 is a circuit diagram showing a configuration of a power factor correction control circuit according to a third embodiment of the invention.

FIG. 11 is a circuit diagram showing a configuration of a power factor correction control circuit according to a third embodiment of the invention.

This power factor correction control circuit 10s is characterized in that it employs a voltage error amplifier circuit 14s using a voltage mode amplifier (an operational amplifier) 15a instead of the voltage error amplifier circuit 14 using the OTA 15. Regarding other configurations of the power factor correction control circuit 10s, reference numerals and characters corresponding to the first embodiment shown in FIG. 1 are given, and a description thereof will be omitted.

Herein, the voltage error signal Ver, which is the first input signal of the multiplier 24, is supplied via the resistor R18 from the output terminal of the voltage mode amplifier 15a to the multiplier 24. Also, the output terminal of the voltage mode amplifier 15a is connected to a terminal FB2. A phase compensation circuit formed of a resistor Ra and a capacitor Ca is connected between two terminals FB1 and FB2. Because of this, on the transient response corrector circuit 38s operating, the current output from the transient response corrector circuit 38s flows into the capacitor Ca via the resistor R18 and, due mainly to a voltage being generated by the current at either end of the resistor R18, and to one portion of the current from the transient response corrector circuit 38s charging the capacitor Ca and the voltage of the output terminal of the voltage mode amplifier 15a rising, the voltage error signal Ver is compulsorily increased, and the transient response is corrected.

The voltage error amplifier circuit 14s using the voltage mode amplifier 15a can also be applied to the second embodiment.

What is claimed is:

1. A power factor correction type switching power supply unit that, based on an alternating current input voltage full-wave rectified in a diode bridge, supplies a direct current output voltage of a step-up type converter having an inductor, a switching element, and an output capacitor to a load, the unit comprising:
a voltage error amplifier circuit that amplifies a difference between a detected value of the direct current output voltage and a first reference voltage, and outputs a voltage error signal;
a multiplier that multiplies the voltage error signal output from the voltage error amplifier circuit and a detected value of the full-wave rectified alternating current input voltage;
a control circuit that on-off controls the switching element based on an output signal of the multiplier and an inductor current signal detecting an inductor current flowing through the inductor;
a soft-stop overvoltage protection circuit, into which a soft-stop overvoltage detection voltage corresponding to the detected value of the direct current output voltage is input, that reduces the output of the multiplier in accordance with the soft-stop overvoltage detection voltage when the soft-stop overvoltage detection voltage exceeds a first threshold value;
an overvoltage protection circuit that, a second threshold value higher than the first threshold value being set, compulsorily turns off the switching element by outputting an overvoltage detection signal when the soft-stop overvoltage detection voltage exceeds the second threshold value;
a transient response corrector circuit having an output increase circuit that, a second reference voltage lower than the first reference voltage being set, compulsorily increases the output of the voltage error amplifier circuit when the detected value of the direct current output voltage is equal to or lower than the second reference voltage; and
an input voltage monitoring circuit that monitors the detected value of the full-wave rectified alternating current input voltage using a third reference voltage, permits the operation of the transient response corrector circuit provided that the detected value of the full-wave rectified alternating current input voltage does not exceed the third reference voltage during a half-cycle of the alternating current input voltage, and prohibits the operation of the transient response corrector circuit when the detected value exceeds the third reference voltage.

2. The power factor correction type switching power supply unit according to claim 1, wherein
in the transient response corrector circuit, the output increase circuit is prohibited from increasing the output of the voltage error amplifier circuit from immediately after the alternating current input voltage is supplied and the step-up type converter starts up until the direct current output voltage first reaches a predetermined threshold value.

3. The power factor correction type switching power supply unit according to claim 1, wherein
the controller includes:
a current error amplifier that outputs a current error signal wherein the difference between the inductor current signal and the output of the multiplier is amplified; and
a PWM comparator that controls an on-off period of the switching element by pulse width modification using the current error signal.

4. The power factor correction type switching power supply unit according to claim 1, wherein
the detected value of the full-wave rectified alternating current input voltage is monitored using a fourth reference voltage lower than the third reference voltage, and the prohibiting of the operation of the transient response corrector circuit is removed provided that the detected value of the full-wave rectified alternating current input voltage does not exceed the fourth reference voltage during a half-cycle of the alternating current input voltage.

5. The power factor correction type switching power supply unit according to claim 1, wherein
the input voltage monitoring circuit includes:
a permission signal holding unit that monitors the alternating current input voltage, and generates and holds a permission signal instructing a permission of the operation of the transient response corrector circuit in accordance with a result of the monitoring; and
a timing detection unit that detects a timing at which the alternating current input voltage reaches zero level vicinity, and instructs the permission signal holding unit of an output timing of the permission signal.

6. The power factor correction type switching power supply unit according to claim 5, wherein
a peak value of the alternating current input voltage is monitored, and the permission signal decided on, in the permission signal holding unit.

7. The power factor correction type switching power supply unit according to claim 5, wherein
an average value of the alternating current input voltage is monitored, and the permission signal decided on, in the permission signal holding unit.

8. The power factor correction type switching power supply unit according to claim 5, wherein
the timing detection unit includes:
a comparison circuit that, a fifth reference voltage of a voltage lower than the third reference voltage being set, detects the timing at which the alternating current input voltage reaches the zero level vicinity by comparing the fifth reference voltage and the detected value of the full-wave rectified alternating current input voltage; and
a pulse generator circuit that generates a one-shot signal from an output signal of the comparison circuit at a timing at which the detected value of the full-wave rectified alternating current input voltage decreases in excess of the fifth reference voltage.

9. The power factor correction type switching power supply unit according to claim 1, wherein
the voltage error amplifier circuit includes an operational transconductance amplifier and an error signal capacitor connected to an output terminal of the operational transconductance amplifier, and
the output increase circuit includes a current source that supplies a current to a connection point of the output terminal of the operational transconductance amplifier and error signal capacitor.

10. A power factor correction type switching power supply unit that, based on an alternating current input voltage full-wave rectified in a diode bridge, supplies a direct current output voltage of a step-up type converter having an inductor, a switching element, and an output capacitor to a load, the unit comprising:
a voltage error amplifier circuit that amplifies a difference between a detected value of the direct current output voltage and a first reference voltage, and outputs a voltage error signal;
a multiplier that multiplies the voltage error signal output from the voltage error amplifier circuit and a detected value of the full-wave rectified alternating current input voltage;
a control circuit that on-off controls the switching element based on an output signal of the multiplier and an inductor current signal detecting an inductor current flowing through the inductor;
a soft-stop overvoltage protection circuit, into which a soft-stop overvoltage detection voltage corresponding to the detected value of the direct current output voltage is input, that reduces the output of the multiplier in accordance with the soft-stop overvoltage detection voltage when the soft-stop overvoltage detection voltage exceeds a first threshold value;
an overvoltage protection circuit that, a second threshold value higher than the first threshold value being set, compulsorily turns off the switching element by outputting an overvoltage detection signal when the soft-stop overvoltage detection voltage exceeds the second threshold value; and
a transient response corrector circuit having an output increase circuit that, a second reference voltage lower than the first reference voltage being set, compulsorily increases the output of the voltage error amplifier circuit when the detected value of the direct current output voltage is equal to or lower than the second reference voltage; wherein
the multiplier includes a bias current determining a gain of the multiplier, and
when the soft-stop overvoltage detection voltage exceeds the first threshold value, the bias current is changed in such a way that the gain of the multiplier decreases further in accordance with an increase of the soft-stop overvoltage detection voltage.

11. The power factor correction type switching power supply unit according to claim 1, wherein
the input voltage monitoring circuit monitors an average value of the full-wave rectified alternating current input voltage using a seventh reference voltage, permits the operation of the transient response corrector circuit when the average value does not exceed the seventh reference voltage, and increases the output of the voltage error amplifier circuit further the larger a differential voltage of the seventh reference voltage and average value.

12. The power factor correction type switching power supply unit according to claim 1, wherein
the voltage error amplifier circuit includes a voltage mode amplifier and an adjustment resistance circuit, one end of which is connected to an output terminal of the voltage mode amplifier, and the output of the transient response corrector circuit is connected to the other end of the adjustment resistance circuit.

13. A power factor correction type switching power supply unit comprising:
a voltage error amplifier circuit that amplifies a difference between a detected value of a direct current output voltage and a first reference voltage, and outputs a voltage error signal;
a multiplier that multiplies the voltage error signal output from the voltage error amplifier circuit and a detected value of a full-wave rectified alternating current input voltage;
a control circuit that on-off controls a switching element based on an output signal of the multiplier and an inductor current signal detecting an inductor current flowing through an inductor;
a soft-stop overvoltage protection circuit, into which a soft-stop overvoltage detection voltage corresponding to the detected value of the direct current output voltage is input, that reduces the output of the multiplier in accordance with the soft-stop overvoltage detection voltage when the soft-stop overvoltage detection voltage exceeds a first threshold value;
an overvoltage protection circuit that, a second threshold value higher than the first threshold value being set, compulsorily turns off the switching element by outputting an overvoltage detection signal when the soft-stop overvoltage detection voltage exceeds the second threshold value;
a transient response corrector circuit having an output increase circuit that, a second reference voltage lower than the first reference voltage being set, compulsorily increases the output of the voltage error amplifier circuit when the detected value of the direct current output voltage is equal to or lower than the second reference voltage; and an input voltage monitoring circuit that monitors the detected value of the full-wave rectified alternating current input voltage using a third reference voltage, permits the operation of the transient response corrector circuit provided that the detected value of the full-wave rectified alternating current input voltage does not exceed the third reference voltage during a half-cycle of the alternating current input voltage, and prohibits the operation of the transient response corrector circuit when the detected value exceeds the third reference voltage.

* * * * *